(12) United States Patent
Unter Ecker et al.

(10) Patent No.: US 10,963,539 B2
(45) Date of Patent: Mar. 30, 2021

(54) INTERACTIVE WEB APPLICATION EDITOR

(71) Applicant: MK SYSTEMS USA INC., Wilmington, DE (US)

(72) Inventors: Oliver Unter Ecker, Los Angeles, CA (US); Nickolas Westman, Los Gatos, CA (US)

(73) Assignee: MK SYSTEMS USA INC., Wilmington, DE (US)

( * ) Notice: Subject to any disclaimer, the term of this patent is extended or adjusted under 35 U.S.C. 154(b) by 462 days.

(21) Appl. No.: 14/580,172

(22) Filed: Dec. 22, 2014

(65) Prior Publication Data

US 2016/0070813 A1  Mar. 10, 2016

Related U.S. Application Data

(60) Provisional application No. 62/048,774, filed on Sep. 10, 2014.

(51) Int. Cl.
*G06F 3/0484* (2013.01)
*G06F 16/958* (2019.01)
(Continued)

(52) U.S. Cl.
CPC .......... *G06F 16/986* (2019.01); *G06F 3/0484* (2013.01); *G06F 8/38* (2013.01); *G06F 16/958* (2019.01); *G06F 8/34* (2013.01)

(58) Field of Classification Search
CPC .......... G06F 17/30896; G06F 17/3089; G06F 3/0484; G06F 8/28; G06F 16/986; G06F 8/38; G06F 16/958; G06F 8/34
See application file for complete search history.

(56) References Cited

U.S. PATENT DOCUMENTS 5,774,667 A * 6/1998 Garvey ............... H04L 41/0813
  709/222
7,047,318 B1 * 5/2006 Svedloff ............. G06F 17/3089
  707/E17.116
(Continued)

FOREIGN PATENT DOCUMENTS

CN    102693323 A    9/2012
EP      1530115 A2    5/2005
(Continued)

OTHER PUBLICATIONS

The Core Less Team: "Client-side usage; Getting started; Less.js", Mar. 10, 2014, XP055247331, Retrieved from the Internet: URL: http://web.archive/org/web/20140310132804/http://lesscss.org/#getting-started, retrieved on Feb. 2, 2016, 5 pages.
(Continued)

*Primary Examiner* — Jennifer N To
*Assistant Examiner* — Parmanand D Patel
(74) *Attorney, Agent, or Firm* — Norton Rose Fulbright US LLP

(57) ABSTRACT

Interactive editing of a web application at a user end station is described. The user end station dynamically loads into a running instance of the web application an interactive editor that allows editing of one or more user interface (UI) components of that running instance of the web application. A selection of a DOM element of the web application is received and a UI component that corresponds to the selected DOM element is determined. A set of parameters associated with the determined UI component is also determined. A value editor is displayed that is configured to display for at least one of the set of parameters a value and allows for that value to be modified. A modification of at least the value of the at least one of the set of parameters is
(Continued)

received and the running instance of the web application is updated to reflect the modified value.

24 Claims, 17 Drawing Sheets

(51) Int. Cl.
*G06F 8/34* (2018.01)
*G06F 8/38* (2018.01)

(56) References Cited

U.S. PATENT DOCUMENTS

| | | | |
|---|---|---|---|
| 7,346,840 B1* | 3/2008 | Ravishankar | G06F 17/3089 707/E17.116 |
| 7,873,965 B2* | 1/2011 | Hayton | G06F 8/38 719/315 |
| 8,281,287 B2 | 10/2012 | Finocchio | |
| 8,387,006 B1 | 2/2013 | Taylor | |
| 8,863,015 B2 | 10/2014 | Almonte et al. | |
| 9,081,591 B2 | 7/2015 | Kinoshita et al. | |
| 2002/0049867 A1 | 4/2002 | Kumagai | |
| 2002/0085033 A1 | 7/2002 | Robinson et al. | |
| 2002/0194586 A1 | 12/2002 | Gutta et al. | |
| 2003/0107591 A1 | 6/2003 | Jameson | |
| 2003/0160822 A1 | 8/2003 | Belz et al. | |
| 2004/0003392 A1 | 1/2004 | Trajkovic et al. | |
| 2004/0044966 A1* | 3/2004 | Malone | G06F 17/24 715/255 |
| 2004/0268413 A1 | 12/2004 | Reid et al. | |
| 2005/0097595 A1 | 5/2005 | Lipsanen et al. | |
| 2005/0144632 A1 | 6/2005 | Mears et al. | |
| 2005/0246653 A1* | 11/2005 | Gibson | G06F 17/30899 715/773 |
| 2006/0041879 A1 | 2/2006 | Bower et al. | |
| 2006/0080382 A1 | 4/2006 | Dutta et al. | |
| 2007/0244880 A1 | 10/2007 | Martin et al. | |
| 2008/0005661 A1 | 1/2008 | Yao et al. | |
| 2009/0063499 A1 | 3/2009 | Koinuma et al. | |
| 2009/0310944 A1 | 12/2009 | Kispert, Jr. | |
| 2010/0235757 A1* | 9/2010 | Kembel | G06F 3/0484 715/745 |
| 2010/0250649 A1* | 9/2010 | Larsson | G06F 17/3089 709/203 |
| 2010/0275135 A1 | 10/2010 | Dunton et al. | |
| 2011/0131513 A1 | 6/2011 | Yamamoto | |
| 2011/0167363 A1 | 7/2011 | Kinoshita | |
| 2012/0072940 A1 | 3/2012 | Fuhrer | |
| 2012/0167041 A1 | 6/2012 | Payzer | |
| 2012/0233239 A1* | 9/2012 | Urim | G06F 9/542 709/203 |
| 2012/0311467 A1 | 12/2012 | Bijani et al. | |
| 2013/0007826 A1 | 1/2013 | Jenkin et al. | |
| 2013/0205277 A1* | 8/2013 | Seven | G06F 8/38 717/121 |
| 2013/0267168 A1 | 10/2013 | Jeon et al. | |
| 2014/0026115 A1* | 1/2014 | Bank | G06F 8/38 717/113 |
| 2014/0324943 A1* | 10/2014 | Antipa | H04L 67/42 709/203 |
| 2015/0261506 A1 | 9/2015 | Torgemane et al. | |
| 2015/0264423 A1 | 9/2015 | Torgemane et al. | |
| 2016/0062963 A1* | 3/2016 | Umapathy | G06F 17/2247 715/760 |

FOREIGN PATENT DOCUMENTS

| | | |
|---|---|---|
| TW | 200943075 A | 10/2009 |
| TW | 201109977 A | 3/2011 |
| WO | 2011037761 A1 | 3/2011 |
| WO | 2012117278 A2 | 9/2012 |
| WO | 2012154412 A1 | 11/2012 |
| WO | 2014066537 A2 | 5/2014 |

OTHER PUBLICATIONS

The Core Less Team: "Usage;Less.js", Feb. 8, 2014, XP055247326, Retrieved from the Internet: URL: http://web.archive.org/web/20140208065437/http://lesscss.org/usage/, retrieved on Feb. 4, 2016, 24 pages.

"Node.js", Wikipedia, the free encyclopedia, <http://web.archive.org/web/20140212103306/http://en.wikipedia.org/wiki/Node.js>, Feb. 12, 2014, pp. 1-7.

"7sempra: ""rosetta/README.md at 4faaff621ebc1b4c546d9b3bd559cb01608e9654 . 7sempra/rosetta""", GitHub, <https://github.com/7sempra/rosetta/blob/4faaff621ebc1b4c546d9b3bd559cb01608e9654/README.md>, Nov. 30, 2013, pp. 1-5.".

"Chris Heilmann, ""Detecting and generating CSS animations in JavaScript? Mozilla Hacks""", the Web developer blog, <http://web.archive.org/web/20111011043737/https://hacks.mozilla.org/2011/09/detecting-and-generating-css-animations-in-javascript/>, Sep. 5, 2011, pp. 1-4.".

Github: "Releases. grnadav/css2js. GitHub", <https://github.com/grnadav/css2js/releases>, May 6, 2015, 1 page.

Nadav Greenberg, "css2js 0.1.4", Github, <https://github.com/grnadav/css2js/archive/0.1.4.zip>, Dec. 22, 2013, pp. 1-12.

Popp et al., Tool support for automated multi-device GUI generation from discourse-based communication models, Jun. 2013, 6 pages.

Song et al., Rapid GUI development on legacy systems: a runtime model-based solution, Oct. 2012, 6 pages.

Wikipedia: "LESS (stylesheet language)", Wikipedia, the free encyclopedia, <http://web.archive.org/web/20140301154742/http://en.wikipedia.org/wiki/LESS_(stylesheet_language)>, Mar. 1, 2014, pp. 1-7.

Gary Sims, "Android Studio First Impressions—Android Authority", May 16, 2013, Retrieved from the Internet at: URL: https://web.archive.org/web/20130826134600/http://www.androidauthority.com/android-studio-first-impressions-210798/AndroidAuthority.com, 7 pages.

Push API W3C Working Draft, W3C, Aug. 15, 2013, Retrieved from the Internet at: URL: https://web.archive.org/web/20140704070145/http://www.w3.org/TR/2013/WD-push-api-20130815/, 8 pages.

* cited by examiner

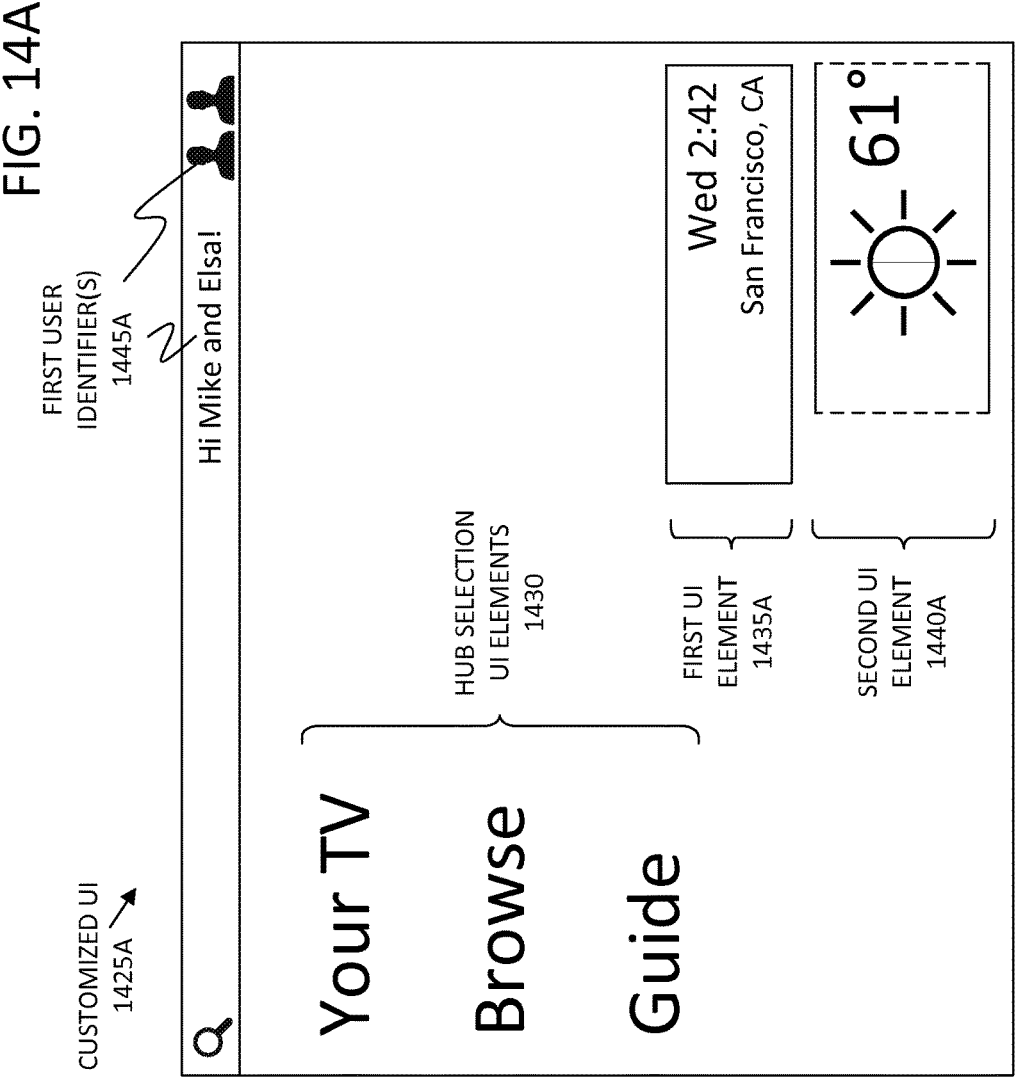
FIG. 14A
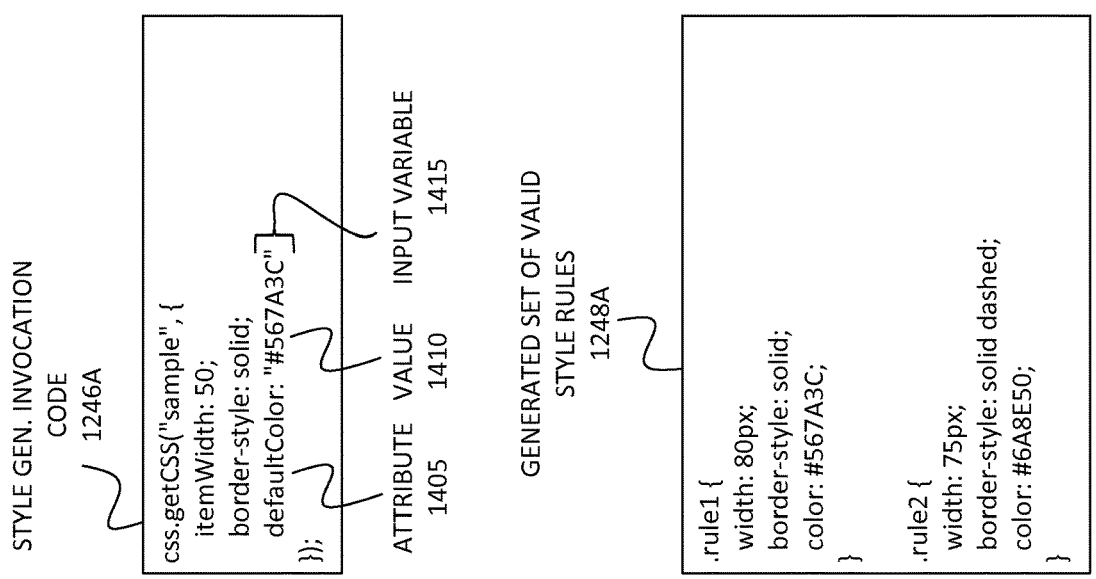

1700

RECEIVING, AT A SET OF NETWORK INTERFACES OF THE USER END STATION FROM A SERVER END STATION, STYLE GENERATION CODE, WHEREIN THE STYLE GENERATION CODE, WHEN EXECUTED BY A SET OF ONE OR MORE INVOCATIONS USING A SET OF ONE OR MORE INPUT VARIABLES CORRESPONDING TO THE SET OF VARIABLES, GENERATES A SET OF ONE OR MORE VALID STYLE RULES OF A STYLE STANDARD AND DYNAMICALLY INJECTS THE VALID STYLE RULES INTO AN APPLICATION 1705

RECEIVING, FROM THE SERVER END STATION, THE SET OF INVOCATIONS USING THE SET OF INPUT VARIABLES 1710

CAUSING THE CUSTOMIZED USER INTERFACE TO BE PRESENTED TO THE USER AS A RESULT OF EXECUTING THE STYLE GENERATION CODE ACCORDING TO THE SET OF INVOCATIONS, WHEREIN THE USER INTERFACE INCLUDES A SET OF ONE OR MORE USER INTERFACE ELEMENTS THAT ARE STYLED ACCORDING TO THE SET OF VALID STYLE RULES 1715

FIG. 17

INTERACTIVE WEB APPLICATION EDITOR

CROSS-REFERENCE TO RELATED APPLICATIONS

This application claims the benefit of U.S. Provisional Application 62/048,774, filed Sep. 10, 2014, which is hereby incorporated by reference.

FIELD

Embodiments of the invention relate to the field of application editing; and more specifically, to an interactive web application editor.

BACKGROUND

A web application is software that typically runs in a browser or other network application and is created using technologies understood by the browser, such as HyperText Markup Language (HTML), Cascading Style Sheets (CSS), and client-side scripting languages (e.g., JavaScript). These technologies are commonly used to directly create the user interface (UI) of the web application and provide the functionality of the web application.

Client-side web application technologies do not have defined "UI widget sets" such as those commonly found on native application platforms such as the Windows platform, Macintosh platform, etc. As a result, typically the UI elements on a web application needs to be created/defined. Also, there is no standard for creating/defining UI elements for web applications. Although popular frameworks such as jQuery exist and simply allow for Document Object Model (DOM) and CSS access and manipulation, such frameworks do not provide UI abstractions. Therefore subtle differences between browsers and platforms (e.g., mobile platform versus a desktop platform) require specific knowledge and treatment in order to provide satisfying user experiences. As a result of these challenges, UI creation for a web application is typically ad-hoc, incomplete, cumbersome, and often faulty or lacking in functionality, as compared to UI development for native application environments. For example, something as conceptually simple as including a "performant" button (a button that responds reliably and with native-like latency when selected by the user) is challenging in a web application versus a native application.

Interactive editors exist for certain web technologies such as HTML, CSS, and JavaScript and are regularly used in web application development. However, such technologies rely on the user understanding the syntax of the technologies and thus they are generally accessible or used only by software developers skilled in those web technologies.

IPTV is a multimedia delivery platform that utilizes a packet-based network infrastructure (e.g., broadband Internet access networks) to deliver video content to customers, typically as an alternative to delivery by traditional over-the-air television, satellite television, and cable television. A typical IPTV solution includes head-end video acquisition equipment for receiving television content, intermediate IPTV facilities (e.g., Ericsson Mediaroom™) including server platforms and associated IPTV middleware, networking devices (e.g., routers, switches) for content distribution between various nodes of the IPTV system, access nodes (e.g., very-high-bit-rate digital subscriber line (VDSL or VHDSL) or passive optical network (PON) equipment) to enable high-bandwidth transport to and from the customer premises, and operator-provided applications that manage the IPTV system and/or provide end-user IPTV applications.

Consumers (also referred to as users, end users, viewers, customers, or subscribers) of IPTV services utilize user interfaces of operator-provided applications on end stations (such as set-top boxes (STBs), tablets, smartphones, laptops, personal computers, etc.) to access IPTV content. However, these applications are difficult to create, as they are often tremendously complex systems including many layers of abstraction and rely upon customized code bases. Further, it is also desired, by operators, to provide custom application user interfaces (UIs) for different users or devices, and it has proven tremendously difficult to both generate and maintain such custom UIs.

The appearance and behavior of UIs for web applications have typically been pre-defined. The code that defines it—CSS, for the most part—is traditionally fixed past compile-time and typically statically referenced by a web application. Although some applications may permit "skinning" for the purposes of app customization, many applications (e.g., those of large companies) require a great deal of customization far beyond what "skinning" can provide, as there is a need to be able to control how user interface elements should look and/or behave—perhaps radically differently. To satisfy such requirements, some application developers have turned to digging into code bases and (statically) applying such customizations. This usually requires expert knowledge of the code base, and can lead to many unintended bugs being created. Accordingly, there is a need for a solution for modifying complex web applications that allows creating widely differing UI experiences, depending on developer preference, without requiring code base changes.

Cascading Style Sheet (CSS) pre-processors have been one approach recently used to more easily build rich web technology based applications that can be customized. However, CSS pre-processors are typically designed to be run as part of a build step to produce static CSS files that can then be used directly by browsers without additional customization. Additionally, some CSS pre-processors perform all parsing, transforming, and variable replacement in one computationally expensive step on the client side, thereby degrading the performance and user experience.

SUMMARY

In an embodiment, an end station is used for interactive editing of a web application. The end station dynamically loads into a running instance of the web application on the user end station an interactive editor that allows editing of one or more user interface (UI) components of that running instance of the web application. The end station receives a selection of a Document Object Model (DOM) element of the web application, determines a UI component that corresponds to the selected DOM element, and determines parameter(s) associated with the determined UI component. The end station displays a value editor that displays at least one value for one of the determined parameter(s) and allows for that value to be modified. The end station receives a modification of at least one value of the determined parameter(s) and updates the running instance of the web application to reflect the modified value. In some embodiments, the update to the UI is performed without reloading the entire web application.

BRIEF DESCRIPTION OF THE DRAWINGS

The invention may best be understood by referring to the following description and accompanying drawings that are used to illustrate embodiments of the invention. In the drawings:

FIG. 14A illustrates style generation invocation code that, when used to invoke the style generation code of FIG. 13, results in the illustrated set of valid style rules and the customized user interface being generated according to an embodiment of the invention;

FIG. 17 illustrates a flow in an end station for utilizing style generation code generated by a server end station for dynamic runtime generation of user interfaces of an application according to embodiments of the invention.

DESCRIPTION OF EMBODIMENTS

Figure 1:
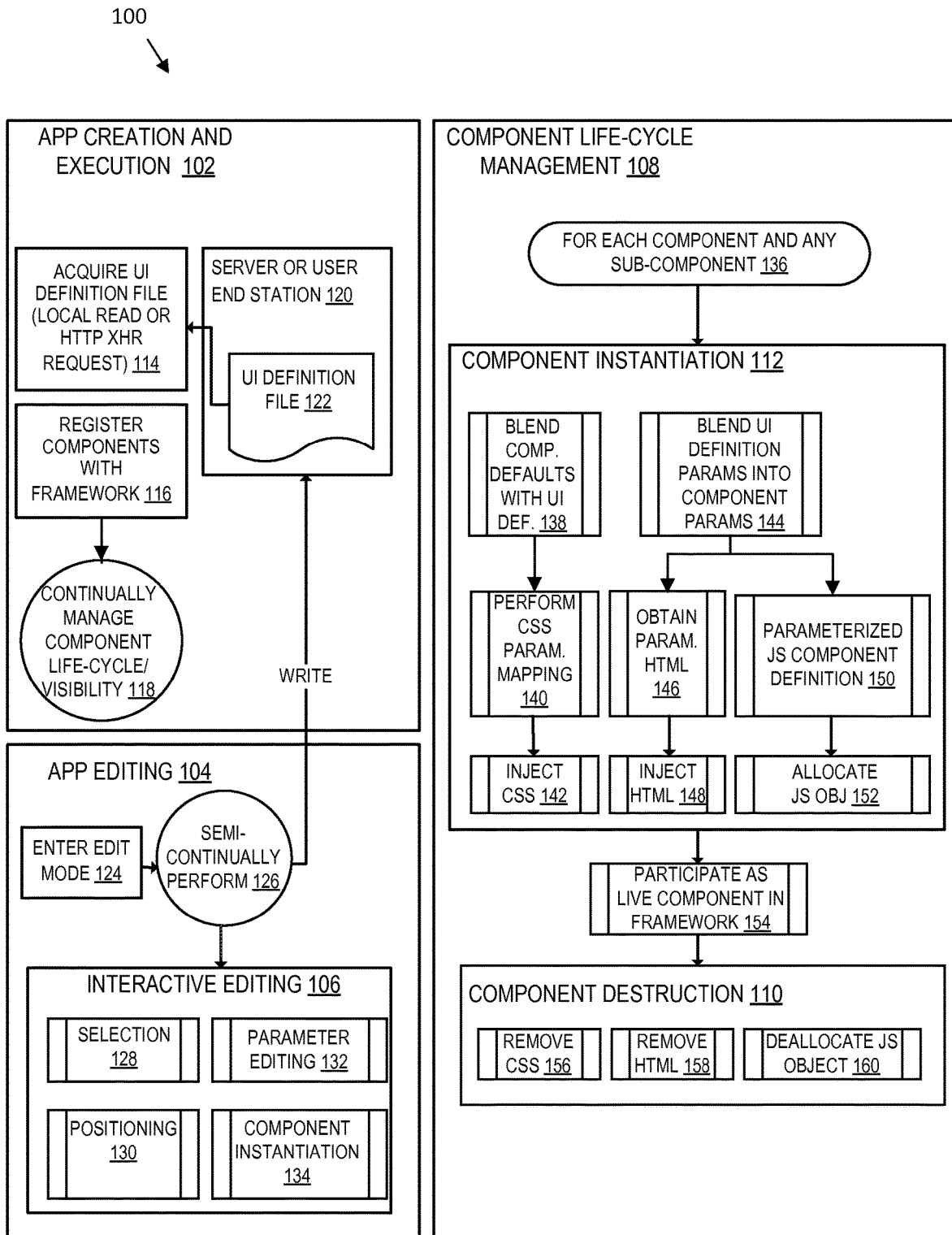
FIG. 1 illustrates stages in a system for dynamic runtime generation of user interfaces of an application according to embodiments of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An interactive web application editor is described herein. A software component (e.g., JavaScript) representing the interactive editor is dynamically loaded into the running instance of a web application that is built from one or more UI components. Responsive to receiving a user selection of a visual representation of a component in the running instance of the web application, the Document Object Model (DOM) element corresponding to the selection is determined and the UI component corresponding to the selected DOM element is determined along with the parameters for the determined UI component. The parameters of the determined UI component may include their types and ranges that are allowed to be viewed by the editor through the interactive editor without prior knowledge of the parameters of the UI component. A value editor is displayed to the user that allows the user to inspect and/or modify the values of the parameter(s). After modifying a value, deleting a value, and/or adding a value, a UI update is triggered and reflected in the currently running instance of the web application. The edited values of the parameters of the components may be persisted. In some embodiments, the update to the UI is performed without reloading the entire web application.

In one embodiment, the interactive editor is used in an environment where the web application is dynamically generated at runtime under control of a UI definition file.

This component framework maps higher-than-implementation level parameter sets to the structure, behavior, and appearance of the web application. This UI definition file may flexibly be used by user end stations to, at runtime, dynamically generate the web application, or used by a server end station to construct ready-to-use application code (e.g., HTML, CSS, and/or JavaScript code). In an embodiment, the UI definition files are used along with a set of component definition files that provide definitions of components that can be instantiated at runtime. Each of the definitions of components may include a set of default visual styles and/or behaviors, which can be overridden/changed through the definitions in the respective UI definition file. Application developers may quickly and easily construct variants of the application by also constructing alternative UI definition files including different definitions that will cause differing appearances, structures, and behaviors of the subsequently generated applications. For example, different UI definition files may be generated for different types of access that various users are permitted access to (e.g., some users are allowed access to a certain type of content, and thus the UI definition file will include definitions for custom UI elements for accessing that content), for different types of end stations (e.g., for larger or smaller displays), for different types of operating systems or supporting applications used by the users, etc. The UI definition file may be edited through use of the interactive editor as described herein.

In some embodiments, the methods, apparatuses, and systems described herein can be used to generate a variety of web technology based applications, such as applications used by users of IPTV systems. In some IPTV systems, the application code that a user interacts with (e.g., the application executing on a STB, tablet, smartphone, personal computer, etc.) is code in order to access IPTV content. These applications, through typically originally created by an IPTV technology provider, are often heavily customized by IPTV operators. Using embodiments of the invention, an IPTV operator need only interact with one or more UI definition files to generate and/or edit one or more customized applications for its users. In some embodiments, the interactive web application editor enables customization of the web application by non-technical staff or even end users; allows the web application to be built from scratch; allows designers to make direct changes to the web application without or with limited developer assistance and support, allows "direct-to-product" design that eliminates error-prone intermediate steps from product design to technical implementation, and allows for concurrent multi-screen or multi-platform development.

FIG. 1 illustrates stages in a system 100 for dynamic runtime generation of a web application at runtime under control of a UI definition file according to embodiments of the invention. The system 100 includes three separate, but interrelated, stages: an application creation and execution 102 stage, an application editing 104 stage, and a component life-cycle management 108 stage.

The application editing 104 stage allows a user to enter into an edit mode (or design mode) 124 to create or edit a UI definition file. This may involve the user launching the interactive editor to edit the UI definition file. The user may begin editing as a semi-continuous process 126, in which interactive editing 106 occurs where the results/effect of an edit may be represented to the user, as will be described in greater detail later herein. This interactive editing 106 may include one or more of component selection 128 (e.g., selecting those components to be edited), positioning 130 (e.g., defining where on the UI the component is to be placed), parameter editing (e.g., changing or setting a value for the selected UI component that affects its structure, behavior, and/or appearance), and/or component instantiation 134 (e.g., loading a defined component for the operator to observe and/or interact with the currently-defined version of a component). As or after the UI definition file is modified, the UI definition file may be saved to the user end station performing the edit or to a server end station.

The application creation and execution 102 stage includes an acquisition 114 of a UI definition file 122, from a server end station or a user end station 120 itself. In embodiments of the invention, the UI definition file includes instructions of a Webapp Definition Language ("WADL"). WADL is a language that permits the description of web application component assemblies, their connections (e.g., behaviors and interactions), and customizer-specific parameter sets for automated web application generation. In an embodiment, WADL serves as the "external definition" part of a larger system for programmatic web application creation. In an embodiment, WADL is aliased on JSON, and thus is easily transported as an XMLHttpRequest (XHR) payload, easily machine-written and machine-read, and human-writable and human-readable. WADL's use of type definitions further permits internal consistency checks and an efficient mapping to internal, computable types. Further, WADL's use of variables permits shared references to one definition, and added comfort for humans writing definitions, and JavaScript pass-throughs permit a large degree of expressiveness at minimal "expense" (to the implementer or learner of the language).

The UI definition file may include many sections detailing components to be included in the application (i.e., the structure of the web application, the appearance of the application, and the behavior of the components within the application). In an embodiment, the UI definition file also includes one or more of a version identifier, a set of "application-wide" default attribute values, and a set of component declarations. A portion of an example UI definition file is provided below as Table A:

TABLE A

Example UI Definition File

```
{
  "version": "0.8",
  "defaults": {
    "container": {
      "backgroundColor": "$dark_backgroundColor"
    },
    "actionButtons": {
      "button": {
        "type": "Size",
        "width": "70px",
        "height": "60px"
      },
      "button_backgroundColor": "$brand_color",
      "in_animation": "none",
      "out_animation": "none"
    }
  },
  "theme": {
    "dark_backgroundColor": "#111111",
    "brand_color": "rgba(100, 50, 30, 0.7)",
    "content_minSize": {
      "type": "Size",
      "width": 1024,
      "height": 786
    },
    "body_font": "\"Segoe UI\", sans-serif"
  },
  "components": [
```

TABLE A-continued

Example UI Definition File

```
{
    "class": "views.Details",
    "root": ".details",
    "components": [
        {
            "class": "actionButtons",
            "layout": {
                "type": "horizontal",
                "contains": "actionButton",
                "controls": "actionBar"
            }
        }
    ]
},
{
    "class": "views.YourStuff",
    "type": "container",
    "params": {
        "feeds": [subscriber:Continue, subscriber:Pins, subscriber:Rentals],
        "resetToFirstTabAndItemOnReEnter": true
    },
    "components": [
        {
            "class": "views.DetailsPane",
            "type": "details_pane",
            "root": "#detailsPanel",
            "params": {
                "metadataPos": {
                    "type": "Position",
                    "top": "72px",
                    "right": "140px"
                }
            }
        },
        {
            "class": "actionButtons",
            "root": "#actionButtons>.actions",
            "params": {
                "barPos": {
                    "type": "Position",
                    "top": "60px",
                    "right": "10px"
                },
                "button": {
                    "type": "Size",
                    "width": "100px",
                    "height": "72px"
                },
                "button_spacing": "4px",
                "in_animation": "slideInFromRight 0.5s both 0.25s",
                "out_animation": "slideOutToRight 0.5s both"
            },
            "layout": {
                "type": "vertical",
                "contains": "actionButton",
                "controls": "actionBar"
            }
        },
        {
            "class": "views.Filmstrip",
            "params": {
                "item_gap": "4px",
                "backgroundColor": "rgba(0,0,0,0.40)"
            }
        }
    ]
}
```

Turning back to FIG. 1, the application creation and execution 102 stage, in addition to using the UI definition file 122, also includes parsing the UI definition file to identify the needed components, and registering these components with a framework 116. The framework has provisions for the runtime instantiation of components, maintaining visibility of certain top level container components (e.g., dialog stacking), and component and component parameter lookup. For example and as will be described in greater detail later herein, the framework provides a function to perform a lookup from an associated DOM node to a component of the running web application and a function to discover/enumerate the parameters of the component. At this point, the component life-cycle management 108 stage is 118 begun.

For each component and every sub-component that may be defined by the UI definition file 136, the component life-cycle management stage 108 stage includes a component instantiation sub-stage 112 that may begin, in an embodiment, as the application begins to launch (e.g., when a browser first loads a page of the application). In this component instantiation sub-stage 112, the default attribute values (as provided by the defined component definition files, which may also include code—HTML and/or JavaScript—to provide the component functionality) will be reconciled (or, "blended") with the defined attribute values from the UI definition file based upon a set of rules. In some embodiments, the component-specific attribute values of the UI definition file will take precedence over conflicting attribute values of the "defaults" portion of the UI definition file, and attribute values of the "defaults" portion of the UI definition file will take precedence over conflicting attribute values set by the component definition files; however, other precedence rules may be defined depending upon the desires of the particular configuration instance.

With the determined "blended" component defaults determined, the component instantiation sub-stage 112 next performs CSS parameter mapping 140 to apply the style rules to the components to be placed in the page without creating conflicts. Next, the style rules (e.g., CSS) are injected into the page. CSS parameter mapping will be described in greater detail later herein.

The component instantiation sub-stage 112 also includes blending 144 the UI definition parameters (e.g., related to component behavior) into the default component parameters. This may also occur according to a precedence rule; in an embodiment, the UI definition parameters take precedence over default component parameters from the component definition files.

Next, the necessary parameterized display code (e.g., HTML) for the necessary components is obtained 146 (based upon code from the component definition files) and the necessary HTML is injected into the application. Similarly, the parameterized script code component definition 150 is gathered and all necessary script code (e.g., JavaScript) to support the components and the UI is allocated 152. Thus, each generated component participates as a live component in the framework 154.

The component life-cycle management stage 108 stage may also include, in an embodiment, a component destruction sub-stage 110 that works to eliminate application components as necessary. For example, if a behavior of one component is to remove another component, that another component may be removed by removing any component-specific style rules (e.g., CSS) 156 from active use, removing 158 any display code (e.g., HTML) of the component from active use, and removing 160 any script code (e.g., JavaScript) objects created for the component.

Figure 2:
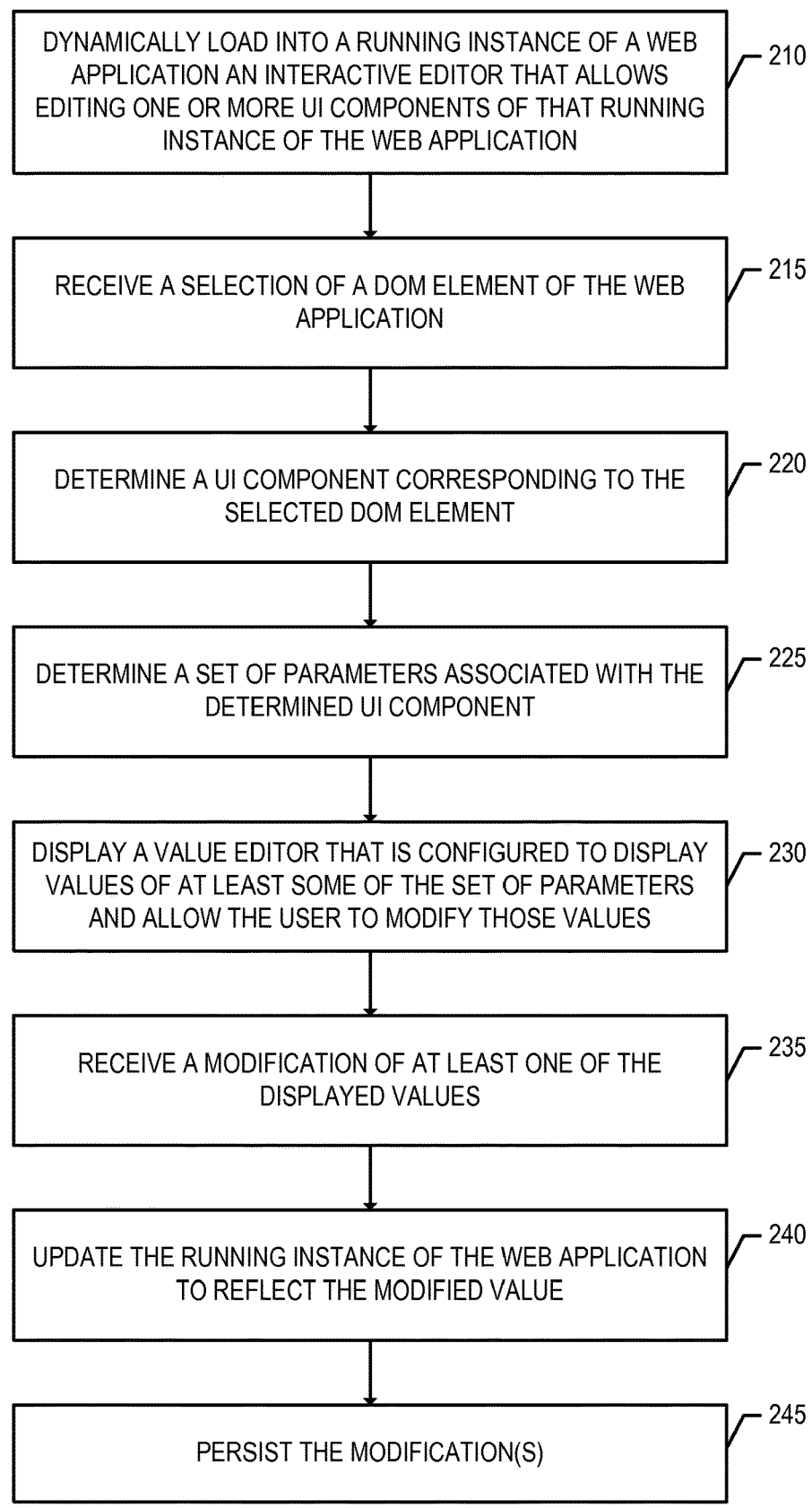
FIG. 2 is a flow diagram illustrating exemplary operations for interactive editing of a web application according to one embodiment.

FIG. 2 is a flow diagram illustrating exemplary operations for interactive editing of a web application according to one embodiment. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams. The operations of FIG. 2 may be performed by an end station such as a user end station or through another computing device. In one embodiment, prior to the operations illustrated in FIG. 2, a web application is dynamically generated at runtime under control of a UI definition file. An exemplary embodiment of generating the web application is described with respect to FIG. 11.

At operation 210, a software component that represents an interactive editor of the web application is dynamically loading into a running instance of the web application. The interactive editor allows editing of one or more UI components of that running instance of the web application. The interactive editor may be a client-side script such as written in JavaScript. The interactive editor may attach itself into the runtime of the web application through DOM manipulation. In one embodiment, the interactive editor may be attached into the runtime through a software hook in the web application. In another embodiment, the interactive editor may be attached into the runtime of the web application through a browser extension, without the knowledge of the web application. Flow moves from operation 210 to operation 215.

At operation 215, a selection of a DOM element of the web application is received. The selection can take different forms including a defined user interaction with the visual representation of a UI component in the running web application (e.g., a right-click on the visual representation, etc.) or through direct text input of a component ID or name. Flow then moves to operation 220. Although to the user selection of the DOM element appears to be relatively simple, it is quite involved on the implementation level to associate the selected DOM element with the component that created it.

At operation 220, the UI component corresponding to the selected DOM element is determined. In one embodiment, the determination includes inspecting the DOM to find the DOM element associated with a component, starting at the selected DOM element and traversing to its parent(s) until it finds the component associated with the selected DOM element, which may be determined through the presence of specific data-attributes registered on the DOM element that indicate its component status and component class association.

Flow then moves to operation 225, where a set of one or more parameters associated with the determined UI component is determined. The set of parameters define the appearance, structure, and/or behavior of the component. For example, example parameters include size (e.g., width, height), color, font, position, range, Boolean feature switch, feature choice values, resource URL, layout orientation, animation curve, animation timing specification, data source, composite objects containing other simple or complex types, action to be performed, etc.

The set of parameters may be stored in the UI definition file. In addition, in some embodiments parameter metadata is also determined such as descriptions, parameter ranges, and parameter value choices. The parameter metadata may be used by the editor to display tips to the user and to configure the value editor (e.g., to present a desired slider range, to present possible values in a drop down menu, etc.). The parameter metadata may downloaded with the web application and may include a manifest of metadata for known components and parameters.

Flow moves from operation 225 to operation 230 where a value editor that is configured to display values of at least some of the set of parameters is displayed such that the user is allowed to modify those values using the value editor. Each parameter that is displayed is presented by the value editor as a pair of a label indicating the parameter name and a value editor appropriate for the parameter's type. If parameter metadata is also determined, the value editor may also display the metadata as appropriate. The user may engage with the value editor to inspect and/or modify the values of the parameters. In some embodiments, a subeditor may be displayed for certain parameter types. For example, a color picker editor may be displayed when a color value is edited or a curve editor may be displayed when an animation curve is edited. Flow then moves to operation 235 where a modification of at least one of the displayed values in the value editor is received.

Flow then moves from operation 235 to operation 240 where the running instance of the web application is updated to reflect the at least one modified value. For example, the UI definition file may be edited to reflect the at least one modified value and the web application may be dynamically regenerated under control of the edited UI definition file. In one embodiment, when the user focuses switches away from the value editor (e.g., the user selects a different part of the web application), the modified parameter value is recorded and a UI update is triggered. The UI may be updated differently in different embodiments, which will be described in greater detail later herein.

Although the UI update may appear to be a simple change to the user (a new value of the parameter is reflected in the currently running web application), a complex process occurs to achieve the UI edit. It should be understood that the new value (the changed parameter value) can cause a single change to the UI or can cause multiple changes to the UI. In addition, the appearance, behavior, and/or structure of the application may be changed by the new value (in little or large ways). The interactive editor does not have prior knowledge of what the UI change is triggered by a parameter value change (this allows for many different kinds of parameter editing outcomes, even for components and parameters that are not currently in existence). In some embodiments, the reload of the web application is done in such a way that it appears to the user that only the portion of the web application that is being edited (directly and selectively) is being reloaded. For example, in some embodiments, instead of reloading the entire web application, only the UI itself is reloaded.

Flow moves from operation 240 to operation 245 where the modification(s) are persisted. There are different ways of persisting the modifications in different embodiments. In one embodiment, the edited UI definition file is stored in local storage (e.g., HTML5 local storage) available to the client device. In such an embodiment, if a browser reload button is pressed that causes the web application to reload completely, the web application is configured to detect the presence of the edited session-stored UI definition file and use that instead of its usual UI definition file. In another embodiment, the edited UI definition file is uploaded to a server for downloading for future requests for the UI definition file.

The web application may be deployed on different platforms that have different display profiles. For example, the web application may be deployed on a smartphone (which has a relatively small display), tablet (which typically has a larger display than a smartphone), and/or on a computing device that is displayed on typically a larger display (e.g., deployed through a set-top box that is coupled to a television set). In one embodiment, a simulation of different platforms can be viewed on the same user interface such that any edits carried out will be reflected on all of the selected different platforms. Non-native platforms are simulated such that the visuals are close to be accurate and interactions will be partially complete. Each simulated platform may have its own UI definition file, so components and/or parameters defined in one platform may not occur in another. Exception handling is performed where such mismatches occur such as ignoring parameters that do not occur on the receiving platform or sending a warning message to the sender that a mismatch has been occurred. Each simulated platform carries out its implementation to an edit and therefore an edit can cause substantially different outcomes across the different platforms.

Figure 3:
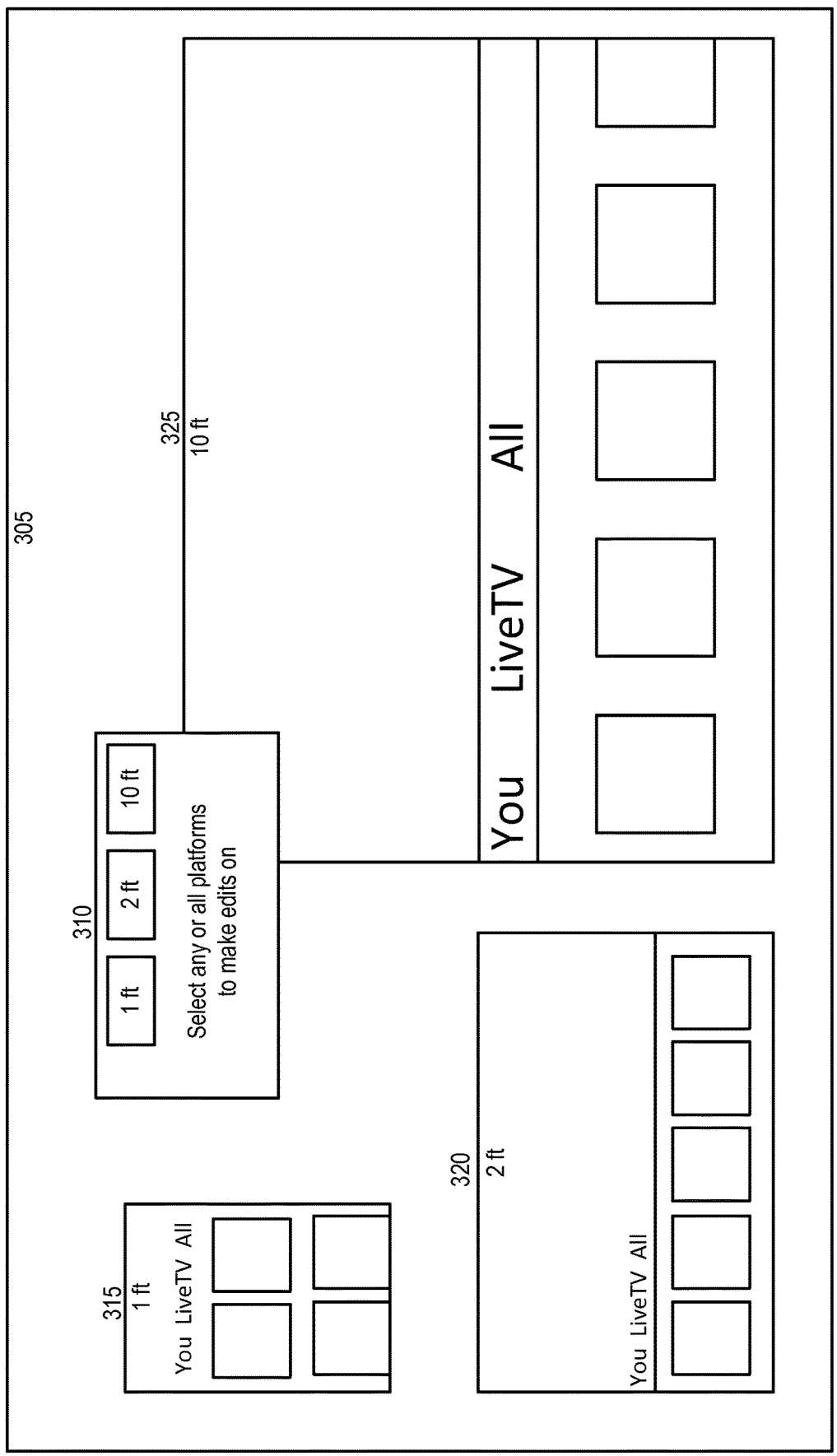
FIG. 3 illustrates an exemplary user interface that shows the simultaneous UI simulation of different platforms according to one embodiment.

FIG. 3 illustrates an exemplary user interface that shows the simultaneous UI simulation of different platforms according to one embodiment. As illustrated in FIG. 3, the user interface 305 includes three different platforms, the platform 315 (represented as a 1 foot platform experience, which is generally considered to be a smartphone platform), the platform 320 (represented as a 2 foot platform experience, which is generally considered to be a tablet or web platform), and the platform 325 (represented as a 10 foot platform experience, which is generally considered to be a television set platform). It should be understood that the number of platforms and the size of the platforms illustrated in FIG. 3 is exemplary and a different number and sizes of platforms may be simulated in accordance with the invention. The user interface includes the simulation selector 310 which allows the user to select different predefined platforms. With respect to FIG. 2, if there are multiple different platforms that are being simulated, the modification of a parameter will be applied to each of the different simulated platforms. For example, similar to operation 240, the web application as deployed on each of the different platforms is updated according to the modification of the parameter. Thus, multiple target devices can be simulated by a single user on a single machine. This may assist the user in evaluating the results of the edits across the different target devices.

Figure 4:
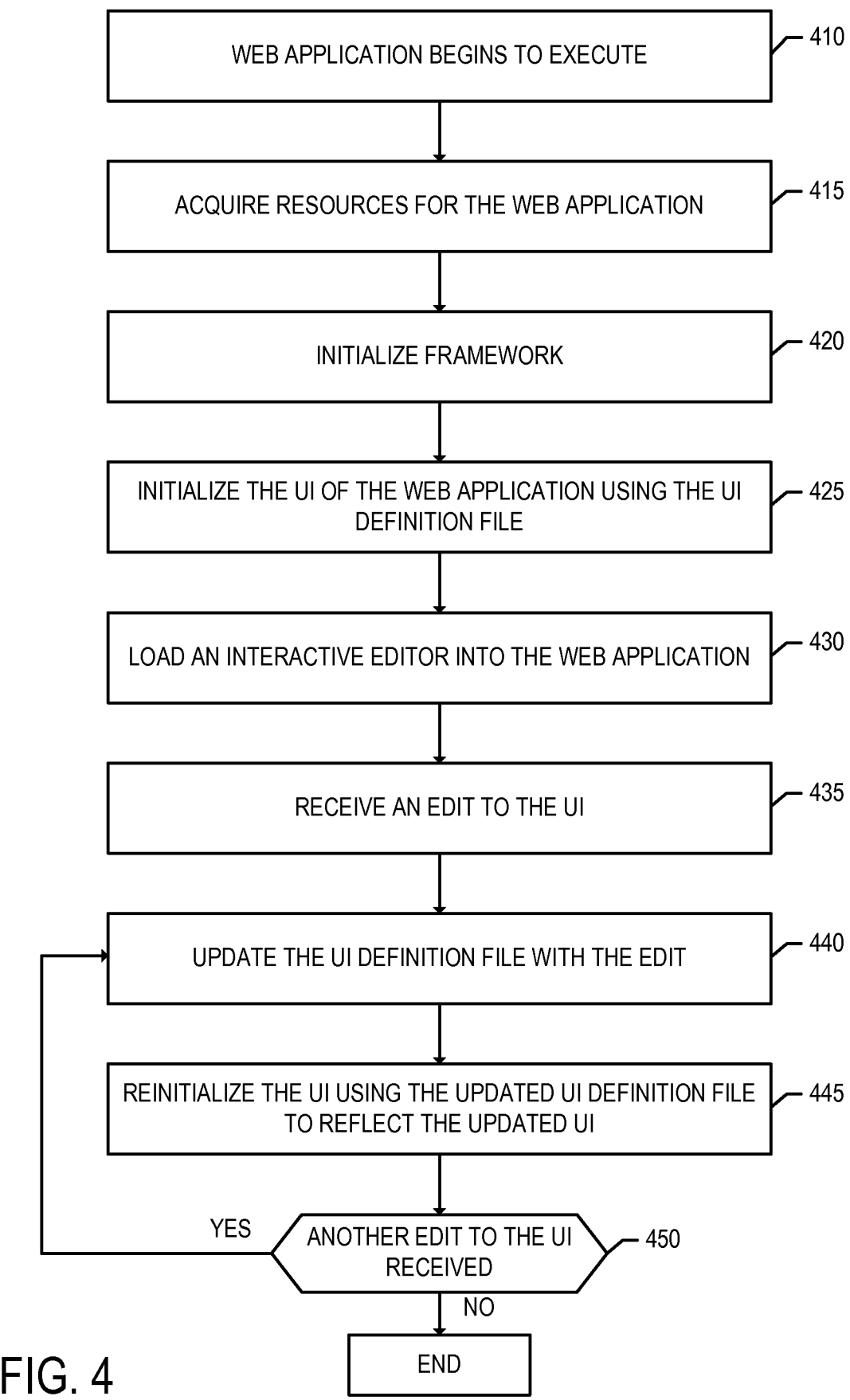
FIG. 4 illustrates exemplary operations performed on a user end station for running a parameterized web application that includes an interactive editor and editing the web application according to one embodiment.

FIG. 4 illustrates exemplary operations performed on an end station for running a parameterized web application that includes an interactive editor and editing the web application according to one embodiment. FIG. 4 illustrates an example of reloading the web application such that only the UI itself is reloaded to improve the performance of the web application.

At operation 410, the end station begins to execute the web application. For example, the end station begins to download the web application and begins to parse and load the web application. Flow then moves to operation 415 where the end station acquires resources required for the web application (e.g., linked in the web application) such as client-side scripting code (e.g., JavaScript), CSS file(s), image(s), etc., by downloading those resources. For example, the end station may acquire the UI definition file (either from a local read or from a server) and a set of one or more component definition files that include code for implementing components (including the set of components indicated by the UI definition file and optionally a set of additional components not defined in the UI definition file).

Flow then moves to operation 420 where the end station initializes the framework including the environment, localization, component framework, singleton, etc. For example, the identified set of components are registered with the component framework of the web application as a registry. Initializing the environment may include determining switches that configure the web application from a dynamically loaded configuration file. Initializing the localization may include loading of text strings applicable to the current locale (country and language). Initializing singleton(s) may include constructing single, fixed instances of objects that provide services to other objects application wide. Initializing the component framework may include initializing technologies to implement the web application such as graphic rendering technologies.

Flow then moves to operation 425, where the end station initializes the UI of the web application using the UI definition file. The UI definition file may be read from a local bundle (e.g., in the case of a hosted client) or downloaded from a network resource (e.g., in a web client) if not already downloaded. The UI definition file stores the externalized parameterized representation of the web application. The structure, behavior, and appearance of the web application can be recreated from the UI definition file and thus fully defines the web application. The components based on the UI definition file and the set of component definition files are dynamically instantiated, which may include dynamically generating HTML, CSS, and/or client-side script objects representing the set of components based upon identifying parameters defined in the UI definition file. In an embodiment, this dynamic instantiation is performed by a UI generation module based upon the parsed UI definition file (which defines which components to instantiate, when to instantiate them, and with which parameters) and the registry. In an embodiment, components may have inherent default parameters, default parameters per component as defined in the UI definition file (in its "defaults" section—see Table A above), and parameters defined on the concrete instantiation level as per the UI definition file (in its "components" section). The component parameters (as defined in the UI definition file and as defaults associated with UI components classes) inform dynamic HTML and CSS generation, which are a part of component instantiation. They also inform the configuration of JavaScript objects representing components within the component framework. In an embodiment, this UI component framework provides raw (not-yet-configured) components and manages the life-cycle (and, implied visibility) of components. In some embodiments, a deployment platform is any web-based rendering application, and in an embodiment a deployment platform is HTML5 and thus supports any device that can run HTML5, including but not limited to smartphones, tablets, and traditional computers.

Flow then moves to operation 430 where an interactive editor is loaded into the web application. The interactive editor may be loaded into the web application in a similar way as previously described with respect to FIG. 2. After the interactive editor is loaded, at operation 435 the end station receives an edit to the UI (e.g., a change in a parameter). The edit may be received in a similar way as previously described with respect to FIG. 2. Flow then moves to operation 440 where the UI definition file is updated to reflect the edit (e.g., a parameter is changed in the UI definition file). Flow then moves to operation 445 where the UI is reinitialized using the updated UI to reflect the modified UI. Reinitializing the UI may be performed in a similar way as initializing the UI with the previous UI definition file. Flow then moves to operation 450 where if there is another edit to the UI received, then flow moves back to operation 440 where the UI definition file is updated with the edit; otherwise the operations end. Thus, instead of the entire web application being reloaded and the resources reacquired, only the UI itself is reloaded.

In addition, although not illustrated in FIG. 4, if data from a server is represented on the UI (as is common), a caching layer between the server requests and the network is used so that re-created UI components (those components that did not change from the edit) can have immediate access to the data. In addition, the framework has the ability to return to the same UI state when a UI reload takes place.

Figure 5:
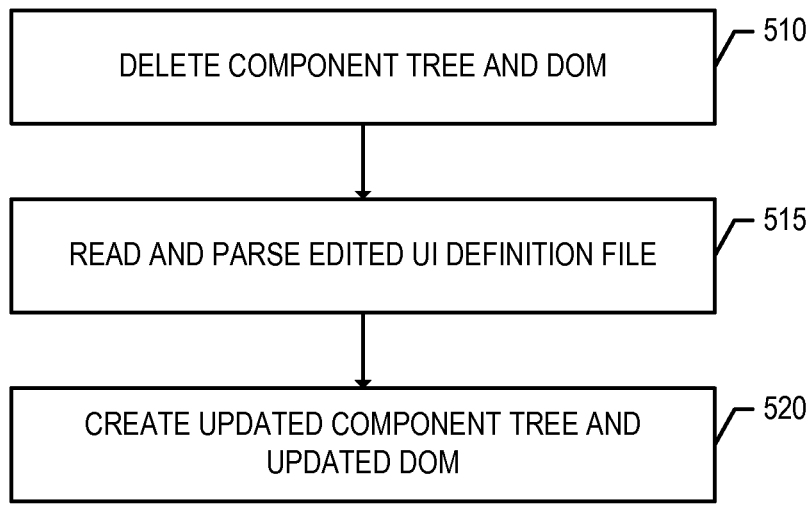
FIG. 5 illustrates exemplary operations for performing the UI reload in one embodiment.
Figure 6:
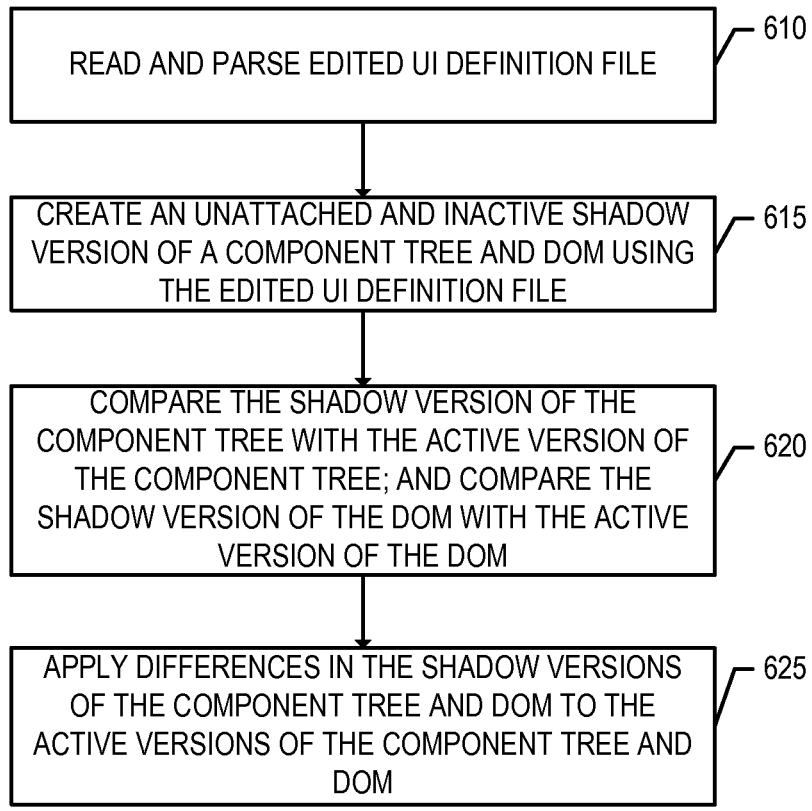
FIG. 6 illustrates exemplary operations for performing the UI reload in another embodiment.

The UI reload may be done differently in different embodiments. FIG. 5 illustrates exemplary operations for performing the UI reload in one embodiment. At operation 510, the component tree and DOM are deleted. Next, at operation 515, the edited UI definition file is read and parsed. Then, at operation 520, an updated component tree and updated DOM is created. FIG. 6 illustrates exemplary operations for performing the UI reload in another embodiment. Unlike the embodiment of FIG. 5, the embodiment of FIG. 6 does not destroy the existing component tree and all associated DOM elements. Instead of destroying and recreating the component tree and the DOM, unattached and inactive shadow versions of the component tree and DOM are created and compared against the unmodified (or previous) versions. Only the differences are applied by transferring state (attributes or elements or live objects) from the shadowed versions to the live/attached versions. The result is an updated component tree and updated DOM where the DOM does not need to be unattached and reattached. This allows an update to appear to be flicker-free to the user.

At operation 610, the edited UI definition file is read and parsed. Next, at operation 615, an unattached and inactive shadow version of the component tree and DOM is created using the edited UI definition file. Next, at operation 620, the shadow version of the component tree is compared with the active version of the component tree and the shadow version of the DOM is compared with the active version of the DOM. Then, at operation 625, the difference(s) between the shadow versions of the component tree and DOM as compared with the active versions of the component tree and DOM is applied. For example, only the new/changed components and DOM elements, or only the changed element attributes, are transferred into the state of the active version of the component tree and DOM. The shadow version of the component tree and DOM may be removed such that there is one active merged component hierarchy and one active merged DOM hierarchy.

In some embodiments, certain user interactions are specified that can be carried out by the user on specific components and specific parameters directly. For example, dragging with a mouse or other input to move a component within its parent component may be performed directly. As another example, changing the parent of a component to be within a new parent component may be performed directly. Such direct manipulations require prior knowledge of the editor of the parameter and the effect editing it will take. Direct manipulation allows for higher interactivity for commonly-performed edits. Direct manipulation also permits the editor to carry out the edit without doing a regular UI update which therefore allows for screen refresh rate-fast performance. In one embodiment, translation (x,y-displacement) of UI elements may be a desired direct manipulation editing operation.

Figure 7:
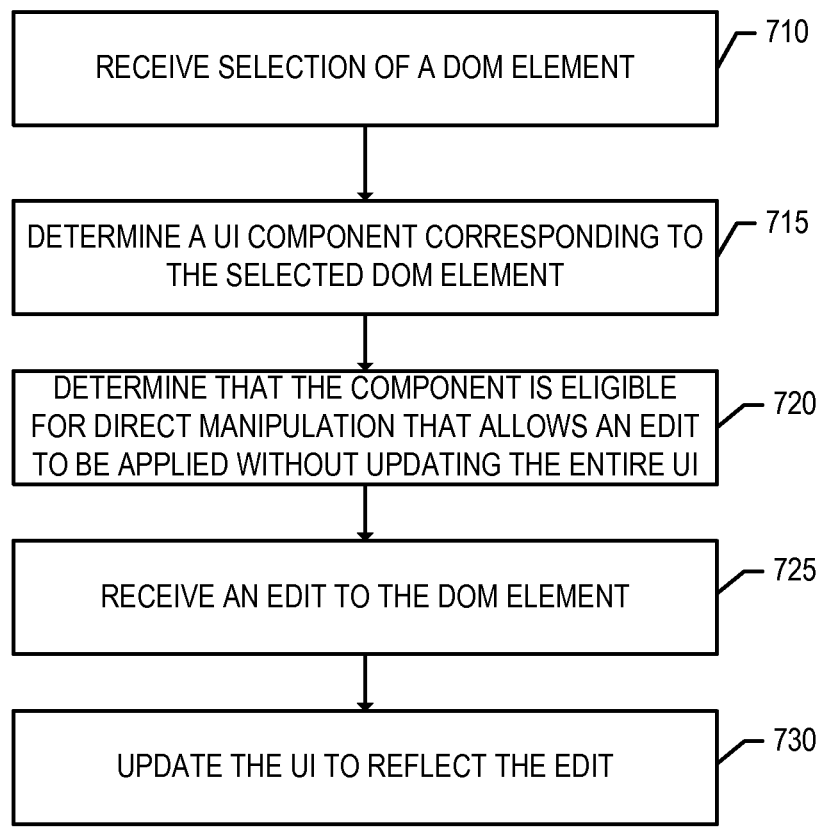
FIG. 7 illustrates exemplary operations for direct manipulation according to one embodiment.

FIG. 7 illustrates exemplary operations for direct manipulation according to one embodiment. At operation 710, a selection of a DOM element is received as similarly described with respect to operation 215. Next, at operation 715, a UI component corresponding to the selected DOM element is determined as similarly described with respect to operation 220. Flow then moves to operation 720 where the selected component is determined to be eligible for direct manipulation that allows the edit to be applied without updating the entire UI. This determination may be performed, for example, by identifying the component or parameter as one that supports direct manipulation. Flow then moves to operation 725 where an edit to the DOM element is received. By way of example, the DOM element is moved by a user. Flow then moves to operation 730 where the UI is updated to reflect the edit.

Figure 8:
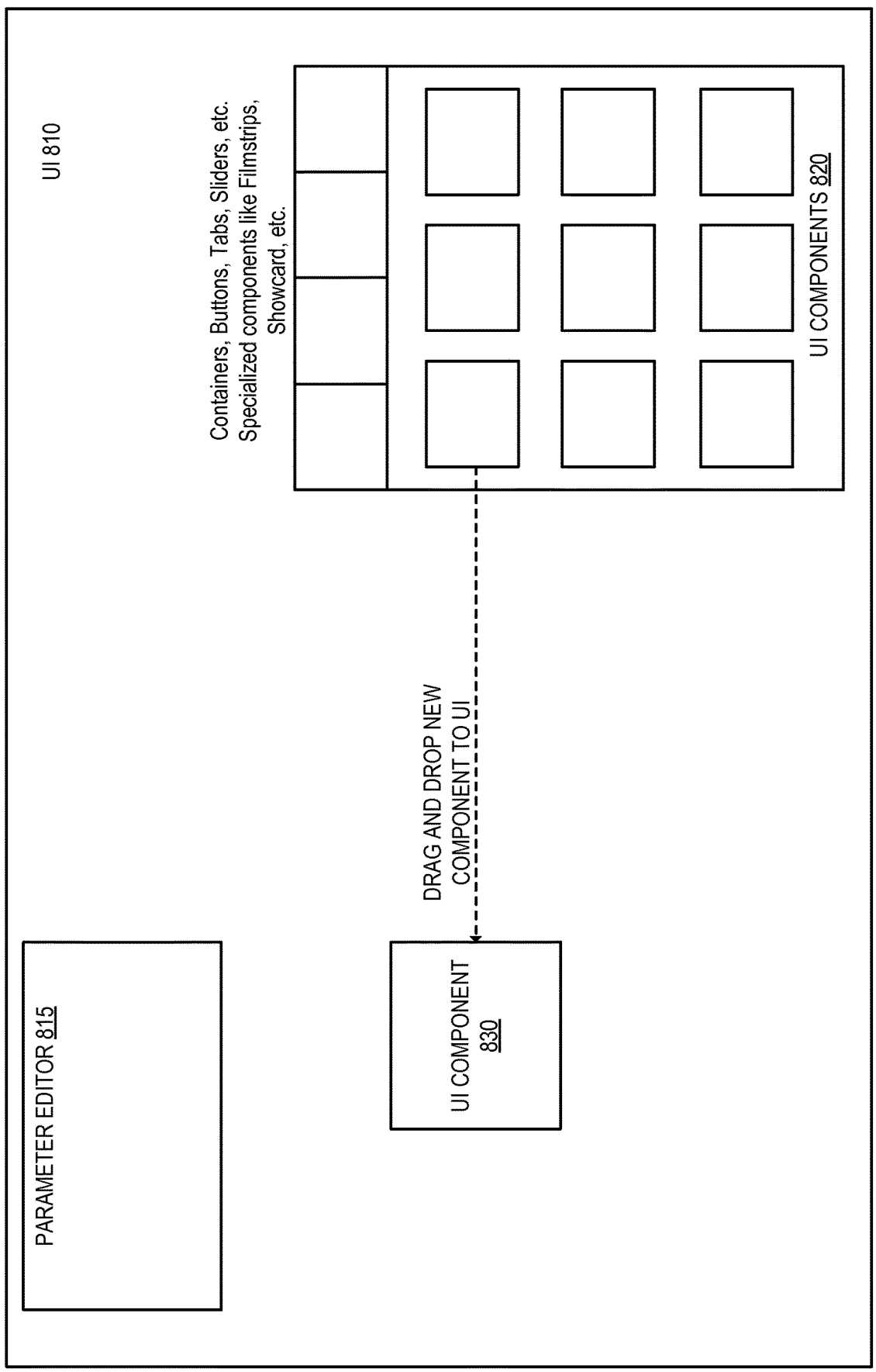
FIG. 8 illustrates an exemplary user interface that includes an affordance for a user to select a predefined available component and add it to a web application according to one embodiment.

In some embodiments, new components may be added to the UI through a user interface that allows the user to choose from a set of predefined available components and through a gesture or other selection (e.g., drag and drop) of one of the predefined available components, a new component can be instantiated within the web application. An entire web application can be built from scratch using such an interface. Also, after selection, components can also be deleted. FIG. 8 illustrates an exemplary user interface 810 that includes an affordance for a user to select a predefined available component and add it to a web application according to one embodiment. A set of predefined UI components 820 are available to be selected and included in the web application. For example, a user can select one of the UI components 820 and drag and drop the new component to the UI to instantiate the UI component 830 into the web application. The newly instantiated UI component 830 can be edited just like any other component on the web application. For example, the parameter editor 815 allows the user to edit the parameters of the UI components. The set of predefined UI components 820 may include common UI elements such as buttons, sliders, tabs, etc., and/or may include domain-specific components.

Embodiments described herein allow for edits to be simultaneously viewed on a simulation of multiple target devices on a single device. In some embodiments, a client/server based architecture is used to distribute the edits to the web application to one or more other target devices. This extends the advantages of the interactive web application editor to connected physical devices. The client/server based architecture includes at least one edits-receiving end station (hereinafter "receiver"), an edits-sending end station (hereinafter "sender"), and may include a server that acts as a conduit for passing messages between senders and receivers. There may be one or more receivers and senders that each interact through a messaging protocol with an introduced session and message-relay server. For example, communications between receivers and senders may be bidirectional and occur over the WebSocket protocol (a protocol for full-duplex communications over TCP/IP). Alternative bi-directional networking protocols may be used.

Figure 9:
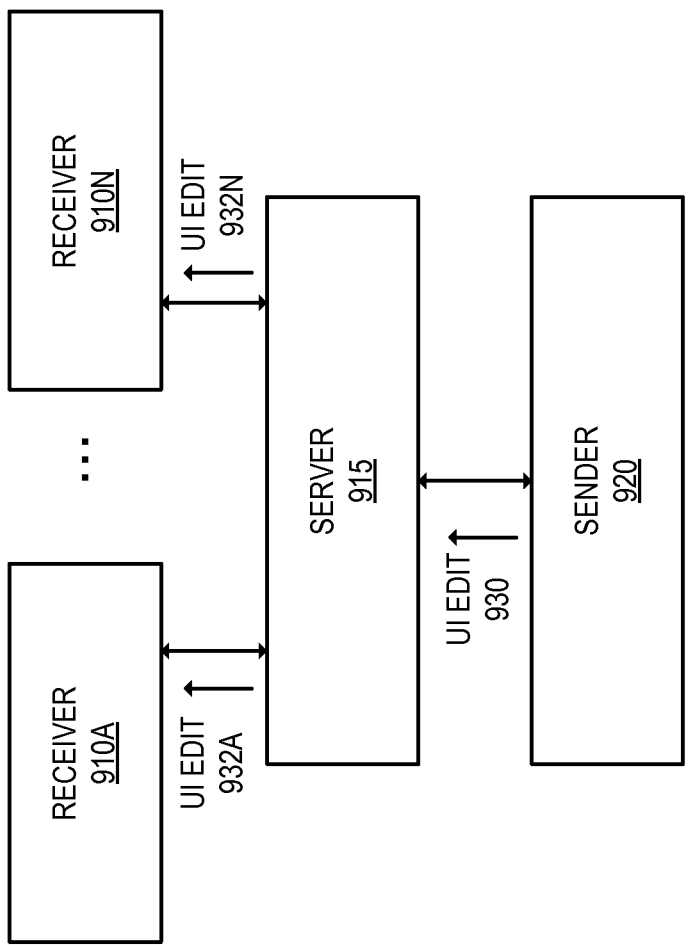
FIG. 9 illustrates an exemplary embodiment for distributing the edits to a web application in accordance with some embodiments.

FIG. 9 illustrates an exemplary embodiment for distributing the edits to a web application in accordance with some embodiments. The sender 920 connects to the server 915 and requests to start a new session. The server 915 performs session management in addition to passing edit messages between the sender and the receivers 910A-N. The server 915 responds to the sender 920 with a session ID and adds the sender 920 to a list of senders it manages for the given session ID. Later, one or more receivers 910A-N connect to the server 915 and request their intention to listen to a session. The server 915 responds with a list of available session IDs. The receivers 910A-N respond with their intention to join a session with a selected ID. The server 915 acknowledges the request and adds each receiver (in this example the receivers 910A-N) to a list of receivers it manages for the given session ID. Sometime later, an edit to the UI is made by the sender 920. When the edit is committed, a message describing the UI edit 930 is transmitted from the sender 920 to the server 915. The server 915 receives the UI edit 930 message and passes the UI edit message to the receivers registered to the given session ID. For example as illustrated in FIG. 9, the server 915 transmits the UI edit messages 932A-N to the receivers 910A-N respectively. Each of the receivers 910A-N receive the edit messages and execute the edit locally. For example, each of the receivers 910A-N updates the running instance of the web application in accordance with the edit in a similar way as described with respect to operation 240 of FIG. 2. The sender 920 and the receivers 910A-N can leave the session at any time. The session will terminate when the sender 920 leaves the session. The sender 920 and the receivers 910A-N may be the same type of device (e.g., with the same screen dimensions) or may be different types of devices (e.g., with different screen dimensions and/or capabilities).

Figure 10:
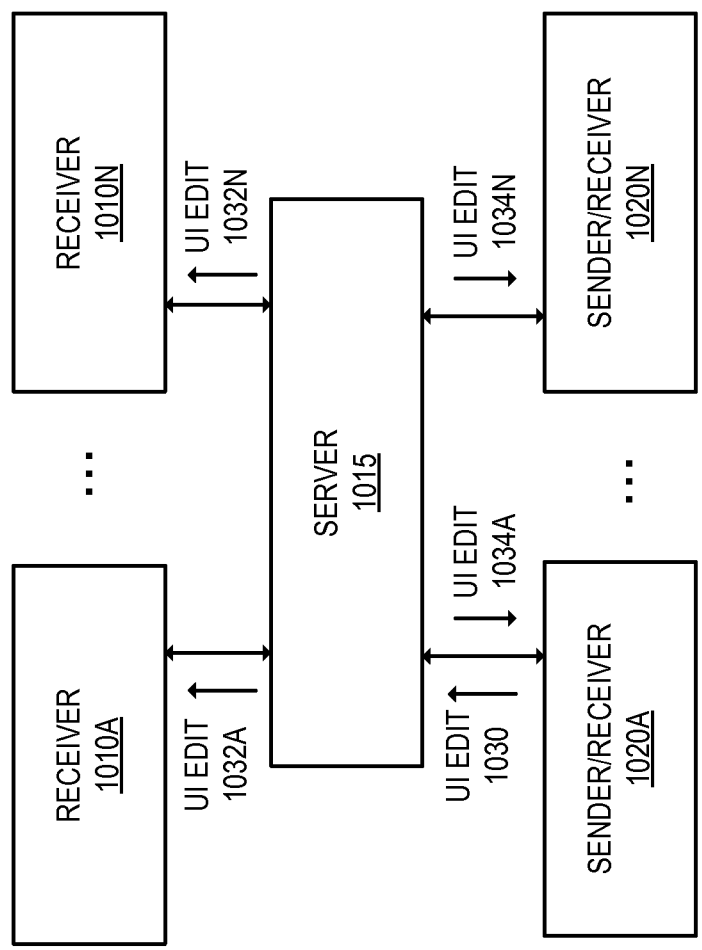
FIG. 10 illustrates an exemplary embodiment for distributing the edits to a web application in accordance with other embodiments.

FIG. 10 illustrates an exemplary embodiment for distributing the edits to a web application in accordance with other embodiments. Unlike the embodiment illustrated in FIG. 9, the embodiment illustrated in FIG. 10 allows for multiple senders to be registered for a given session ID. In such a "multiple sender" embodiment, the senders also act as receivers. Thus as illustrated in FIG. 10, the sender/receivers 1020A-N are coupled with the server 1015 which is also coupled with the receivers 1010A-N. An end station that wants to be a sender of an existing session assumes the role of a receiver by joining the existing session (e.g., by sending a request and session ID to the server 1015). The server 1015 acknowledges or denies the request. The server 1015 may transmit a notification to all of the senders/receivers 1020A-N when a new sender/receiver joins that includes the current sender count. Since a sender is also a receiver, when an edit is committed, it is not automatically performed. The edit is transmitted from the sender/receiver to the server 1015 and will only perform that edit if it subsequently receives the edit message from the server 1015 in its receiver role. For example, the sender/receiver makes a UI edit and sends a message 1030 describing the UI edit to the server 1015. The server 1015 receives the UI edit message 1030 and transmits the UI edit messages 1032A-N to the receivers 1010A-N respectively and the UI edit messages 1034A-N to the sender/receivers 1020A-N respectively. Only after receiving the UI edit message 1034A will the sender/receiver 1020A execute the UI edit locally.

Since in a multiple sender embodiment a sender is also a receiver and edits are performed only when edit messages are received as receivers, all end stations see the same sequence of edit messages. Potential edit conflicts are resolved through serialization by the server 1015 in some embodiments. For example, consider that the sender/receiver 1020A and the sender/receiver 1020N both have the same parameter edited to different values and send their edit messages at approximately the same time. The server 1015 will process one message before the other message and pass that message to the receivers, and then will process the other message and pass that message to the receivers. This ensures that both of the sender/receivers receive the edit messages in the same order. Although edits in a multiple sender embodiment require an extra round-trip to the server as compared to a single sender embodiment, it is a trade-off to ensure that there are no conflicts.

Similarly to FIG. 9, the sender/receivers 1020A-N and the receivers 1010A-N can leave the session at any time. The session will terminate when all of the senders leave the session. At any time, a receiver and/or sender/receiver can request the number of currently registered senders or receivers.

In some embodiments, the receivers 1010A-N and the sender/receivers 1020A-N can join the session at any time. The state of the web application being edited may be out-of-sync with the beginning state of the web application and/or the edits that have been committed. In some embodiments, upon a new receiver joining the session, a notification is sent to all of the sender(s) that informs them of the new receiver and includes information describing the state of the receiver. This state information may include which UI definition is in use (an identifier that identifies the UI definition in use on the receiver may be sent by the receiver when requesting to join the session), how many edit steps have been performed since the last load of the UI definition currently in use on the receiver, etc. Based on this message, the sender may, through a server request, push a list of edit messages that are designed to synchronize the joining receiver to the current state of the edit session. The joining receiver may apply the list of edit messages (e.g., through iterative use of its mechanism of performing edits from edit messages).

In some embodiments, the edit messages include both old and new values for a subject parameter and a conflict resolution procedure is performed. The receiver inspects a newly received edit message and compares the "old" value with its current value for the subject parameter. The edit will be carried out only if these values match. If these values do not match, the receiver, through its duplex communication channel to the server, sends a conflict message back to the sender(s) and the sender(s) display this conflict. This flags the conflict to the user making the edit and provides a way to manually inspect and resolve the edit. For example, an embodiment may display a warning icon next the parameter edited, decorated with the platform that reported a conflict and the pre-existing value at the receiver. The user may ignore the conflict and accept that the edit is not carried out at the conflicting end station. Alternatively, the user may through some affordance—for example, click on said warning icon—send an edit message back to receivers of the conflicting platform with an override flag set. Receivers will set the new target value, irrespective of a mismatch between old and existing value, if the override flag is set. Thus the system guards against accidental overrides of intentionally different parameter values per platform, but still allows the user to force a value update.

Figure 11:
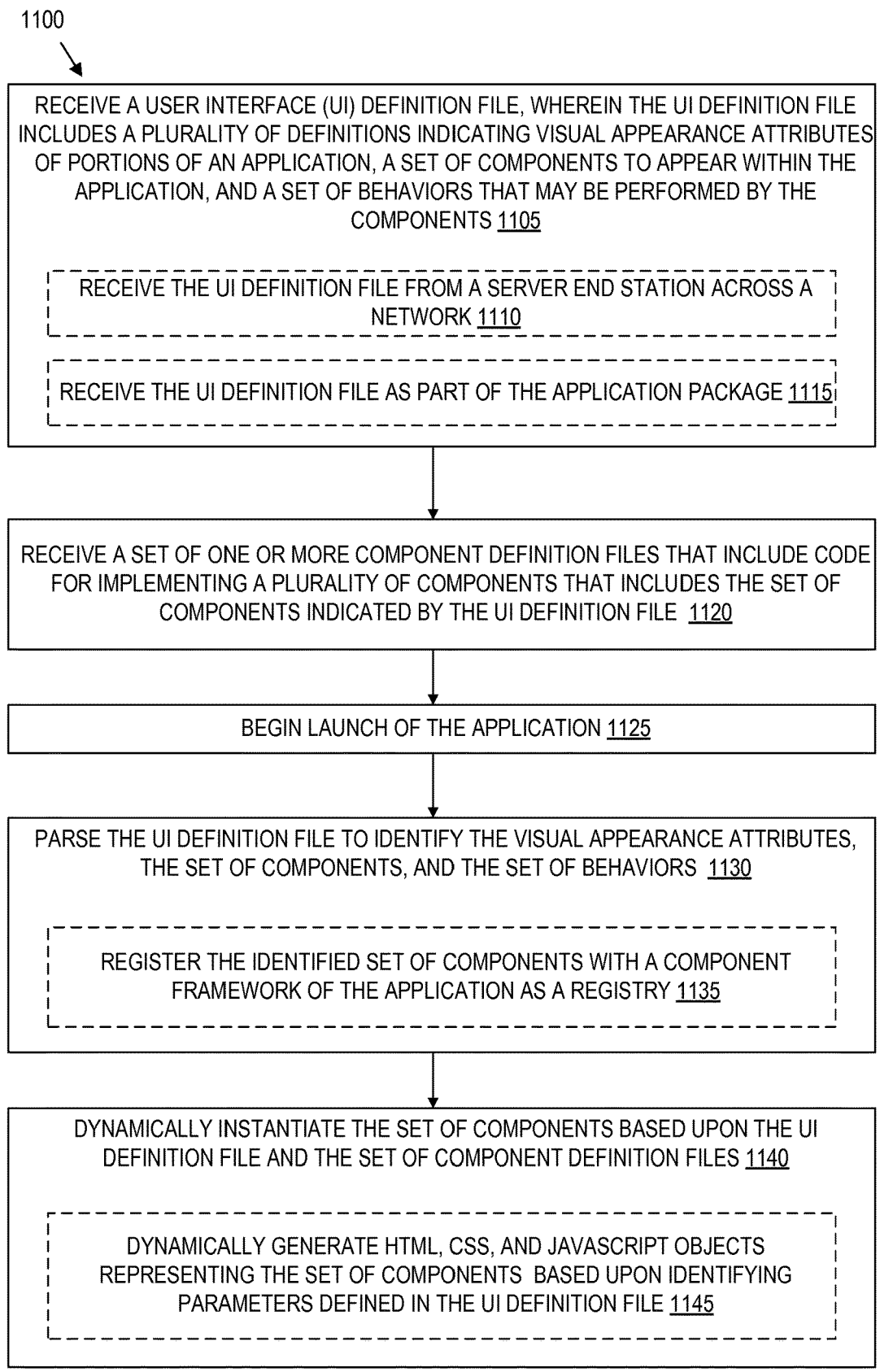
FIG. 11 illustrates a flow in an end station for dynamically generating an application at runtime based upon a UI definition file according to embodiments of the invention.

FIG. 11 illustrates a flow 1100 in an end station for dynamically generating an application at runtime based upon a UI definition file according to embodiments of the invention. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams.

The flow 1100 includes, at block 1105, the end station receiving a user interface (UI) definition file. The UI definition file includes a plurality of definitions indicating visual appearance attributes of portions of an application, a set of components to appear within the application, and a set of behaviors that may be performed by the components. Optionally, this receiving of the UI definition file occurs at block 1110 from a server end station across a network 1110, and optionally this receiving of the UI definition file occurs as part of the application package at block 1115.

In some embodiments, the operator generates the UI definition file through a simple text-based interface, a drag-and-drop interface (for adding components into a UI), or a combination of the two. The UI definition file may also be generated using the interface illustrated in FIG. 8.

The flow 1100 also includes, at block 1120, receiving a set of one or more component definition files that include code for implementing a plurality of components. The plurality of components includes the set of components indicated by the UI definition file (i.e., all of the set of components, and possibly additional components, have definitions in the set of component definition files).

After a beginning launch of the application, at block 1125, the UI definition file is read/parsed to identify the visual appearance attributes, the set of components, and the set of behaviors at block 1130. Optionally, the parsing at block 1130 includes registering the identified set of components with a component framework of the application as a registry, at block 1135.

The flow 1100 also includes, at block 1140, dynamically instantiating the set of components based upon the UI definition file and the set of component definition files. In an embodiment, this includes, at block 1145, dynamically generating HTML, CSS, and JavaScript objects representing the set of components based upon identifying parameters defined in the UI definition file.

In one embodiment, upon the web application being updated to reflect an edit to the UI, the steps of operations 1130-1145 are performed in accordance with the updated UI definition file.

In an embodiment, this dynamic instantiation is performed by a UI generation module based upon the parsed UI definition file (which defines which components to instantiate, when to instantiate them, and with which parameters) and the registry. In an embodiment, components may have inherent default parameters, default parameters per component as defined in the UI definition file (in its "defaults" section—see Table A above), and parameters defined on the concrete instantiation level as per the UI definition file (in its "components" section). The component parameters (as defined in the UI definition file and as defaults associated with UI components classes) inform dynamic HTML and CSS generation, which are a part of component instantiation. They also inform the configuration of JavaScript objects representing components within the component framework. In an embodiment, this UI component framework provides raw (not-yet-configured) components and manages the lifecycle (and, implied visibility) of components. In some embodiments, a deployment platform is any web-based rendering application, and in an embodiment a deployment platform is HTML5 and thus supports any device that can run HTML5, including but not limited to smartphones, tablets, and traditional computers.

Accordingly, embodiments of the invention permit the run-time construction of web application manifolds within the limits of a finite set of UI building blocks (i.e., components) and their associated finite set of configuration parameters, under control of a UI definition file.

Figure 12:
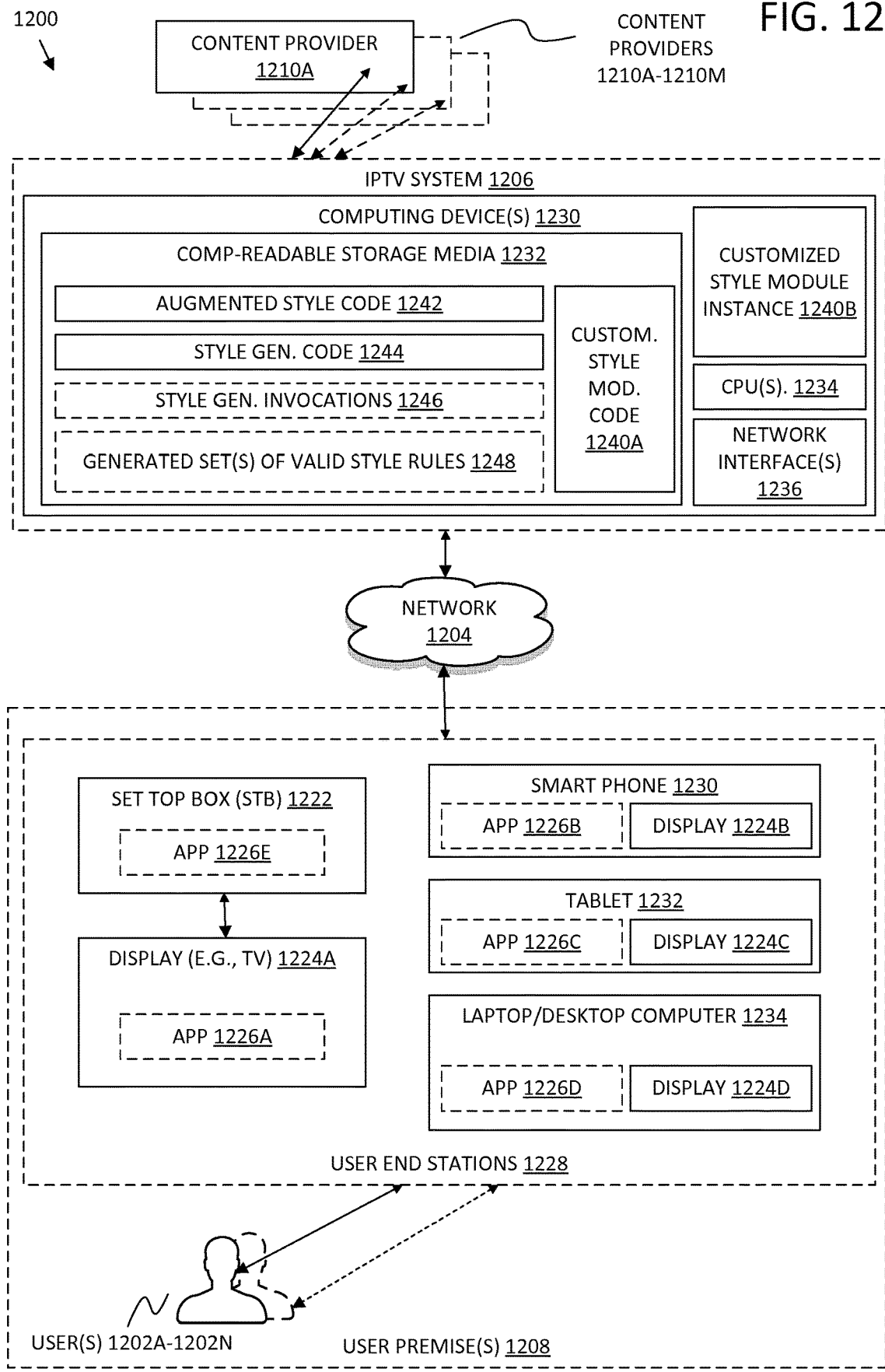
FIG. 12 illustrates a block diagram of a system including an IPTV system utilizing dynamic runtime application generation based upon style rule parameterization according to an embodiment of the invention.

FIG. 12 illustrates a block diagram of a system 1200 including an IPTV system 1206 utilizing dynamic runtime application generation based upon parameterized code according to an embodiment of the invention. The system 1200 includes one or more content providers 1210A-1210M that provide video assets to the IPTV system 1206 (or directly to end stations 1228), which are ultimately to be distributed/communicated with end stations 1228 (optionally at a user premise 1208) via a communication network 1204. The communication network 1204 may include any type of data network, voice network, broadcast network, IP-based network, and/or wireless network facilitating communication of data and media content in any format. The communication network 1204 can be implemented using any well-known type of network topology and/or communication protocol, and may be represented or otherwise implemented as a combination of two or more networks.

The user end stations 1228 (or viewing systems, consumer devices, client devices, etc.) are electronic devices used by users 1202A-1202N to access video assets via an application 1226A-1226E providing access to the IPTV system 1206. A non-exhaustive set of end stations 1228 are illustrated herein and include a Set Top Box (STB) 1222 which is connected to a display 1224A (commonly a television, but can also be another type of monitor, projector, etc.). Other end stations 1228 include a smart phone 1230, a tablet 1232, and a laptop or desktop computer 1234—each of which may include a processor, computer-readable storage, a display 1224B-1224D, and optionally an application 1226A-1226E that executes to allow connectivity/interaction with the IPTV system 1206. However, other end stations can be implemented as any one or combination of wired and/or wireless device, as any form of television client device (e.g., STB 1222, digital video recorder (DVR)), gaming device, computer device, portable computer device, consumer device, media device, communication device, video processing and/or rendering device, appliance device, mobile phone (e.g., cellular, Voice over IP (VoIP), Wi-Fi, etc.), a portable media device (e.g., a personal/portable media player, handheld media player, etc.), wearable device, and/or as any other type of device that is implemented to receive media content in any form of audio, video, and/or image data. An end station (e.g., STB 1233) may also be associated with a user 1202A (i.e., a person) and/or an entity that operates the device.

The various end stations (1222, 1230, 1232, 1234) shown in system 1200 may or may not include a respective display device (e.g., 1224A-1224D). An end station and display device together render and playback audio, video, and/or image data. A display device (e.g., display 1224A) can be implemented as any type of a television, high definition television (HDTV), Liquid Crystal Display (LCD), Light-Emitting Diode (LED) display, or similar display system. The various client devices (e.g., television, gaming, or computer devices) may also be associated with one or more input devices, such as a remote control device for accepting user-selectable input and selections to the television client device, a gaming controller for user-selectable inputs to the gaming device, and/or a keyboard and/or mouse input devices for user-selectable input to the end station. The end stations described herein can also be implemented with any differing combinations of other components such as one or more processors, communication components (e.g., network interfaces), memory components, and/or processing and control circuits. For example, an end station may include network interfaces to receive video assets from IPTV system 1206 and/or content providers 1210A-1210M, interfaces to receive broadcast and/or over-the-air inputs via which video assets can be received over the air. The end stations may also include one or more tuners to tune television channels and/or data streams for display and viewing.

The end stations and/or displays may optionally include IPTV applications (or "apps") 1226A-1226E to assist in providing connectivity to the IPTV system 1206. These IPTV apps 1226, when executed by processors of the respective devices, may be configured to cause the respective devices to connect to the IPTV system 1206 (e.g., using a set of network interfaces), send requests to the IPTV system 1206 (e.g., for lists of video assets, for video assets themselves), receive responses from the IPTV system 1206 (e.g., user interface (UI) elements from the IPTV system 1206, video assets), present the user interfaces of the IPTV system 1206 on the displays to the users, and/or display the video assets and any (optional) corresponding user interfaces (e.g., playback controls, additional video assets, advertising, etc.). In some embodiments of the invention, the applications 1226A-1226E are built using web-based technologies, including one or more of HTML code, CSS rules, JavaScript code, etc.

In the depicted embodiment of FIG. 12, the IPTV system 1206 includes one or more computing devices 1230 that include processor(s) 1234, network interfaces 1236 (for connecting to the content providers 1210A-1210M and/or social networking system 1220 and/or end stations 1228), and computer-readable storage media 1232. The computer-readable storage media 1232, in some embodiments, may store copies of video assets, which may be provided by the content providers 1210A-1210M. The term "video asset" is generally used to refer to video or collection of images that may or may not include audio; however, the term "video asset" may also be used generically to refer to a piece of multimedia content, including but not limited to any type of audio, video, and/or image data received from any media content and/or data source. As described herein, a video asset can include recorded video content, video-on-demand (VOD) content, OTT video content, television content (e.g., "live" television, "broadcast" television), advertisements, commercials, music videos, movies, video clips, and other media content. Depending upon configuration, the IPTV system 1206 may provide the video assets to the end stations 1228 via the network 1204, but in some configurations the end stations 1228 use the network 1204 to directly access video assets from content providers 1210A-1210M.

The computer-readable storage media 1232 may also store other media content, metadata, interactive games, network-based applications, and/or any other content or data (e.g., program guide application data, user interface data, advertising content, closed captioning data, content metadata, search results and/or recommendations, etc.) for use by the IPTV system 1206 and/or end stations 1228 when interacting with the IPTV system 1206 and/or video assets.

In the depicted embodiment, the set of processors 1234 of the one or more computing devices 1230 executes a customized style module instance 1240B, which may be launched using customized style module code 1240A stored by the computer-readable storage media 1232. The customized style module instance 1240B is used as part of the system for dynamically generating applications through use of the augmented style code 1242 and style generation code 1244 stored by the computer-readable storage media 1232. The augmented style code 1242, in an embodiment includes portions of style rules following a style standard (e.g., CSS) that have been modified, or augmented, to include expressions including parameters. Thus, the augmented style code 1242, in its entirety, will not strictly follow the style standard and thus will be deemed invalid according to that style standard. The customized style module instance 1240B may translate the augmented style code 1242 into the style generation code 1244. In an embodiment, the style generation code 1244 is executable code (either by the computing device(s) 1230 or by the applications 1226 executing on the end station(s) 1224) that can generate valid style rules 1248 to be used by the applications 1226. In some embodiments, this style generation code 1244 comprises JavaScript code, but in other embodiments it can include any other computer-executable code (e.g., code written in Python, Lua, C++, C, ML, Fortran, PHP, Ruby, VBScript, Scheme, Shell scripts, XSLT, Tcl, Java, Smalltalk, Objective C, C #, Visual Basic, etc.).

In an embodiment, the style generation code 1244 is executed through a set of style generation invocations 1246, which may optionally exist (and be executed by) the computing device(s) 1230 or directly by an end station 1224 at runtime. The set of style generation invocations 1246, in an embodiment, causes the style generation code 1244 to be executed using a set of input variables, which causes the custom generated set of style rules 1248 to be generated. Examples of augmented style code 1242, style generation code 1244, style generation invocation code 1246, and generated sets of valid style code 1248 are now presented in further detail in FIG. 13, FIG. 14A, and FIG. 14B.

Figure 13:
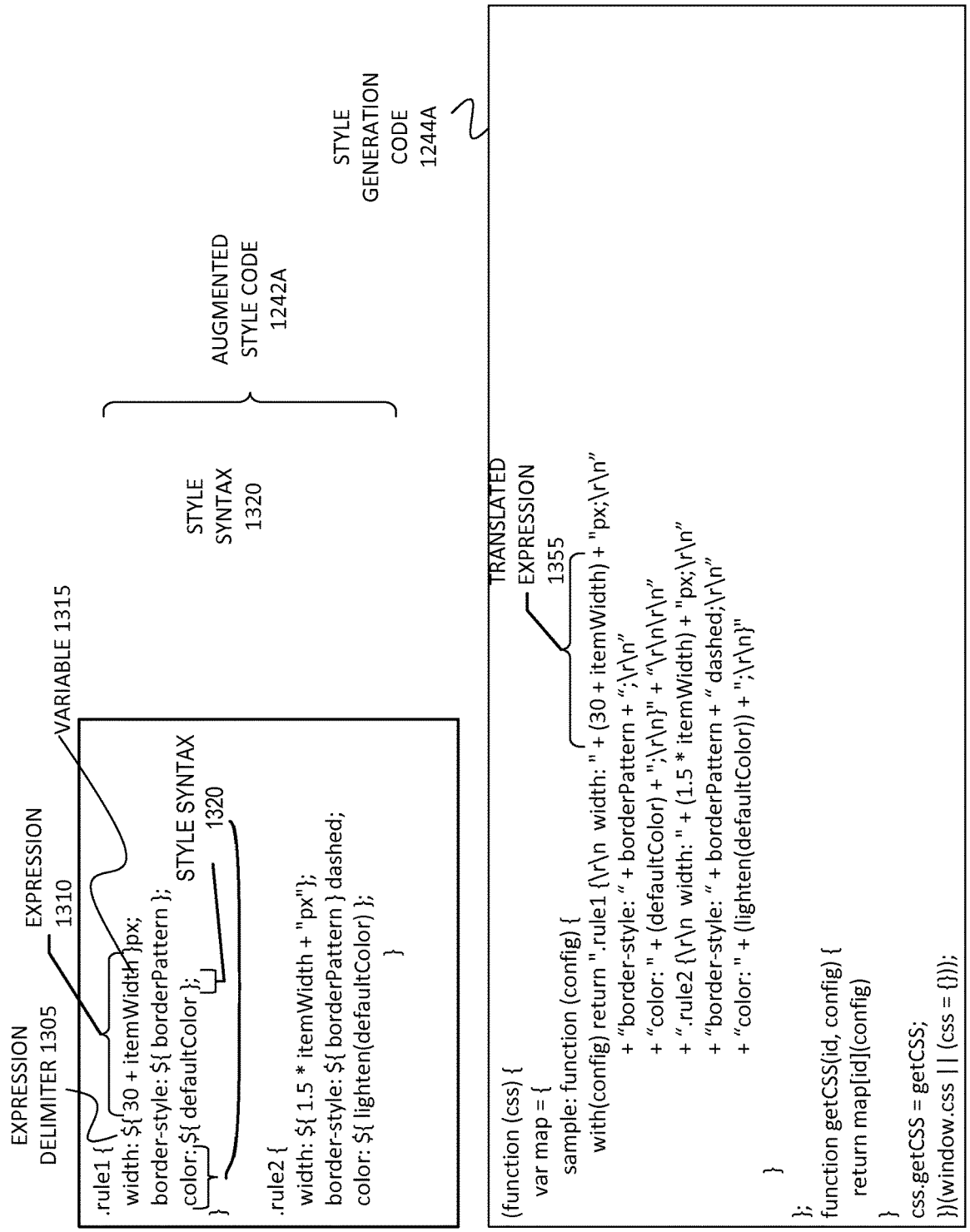
FIG. 13 illustrates augmented style code and style generation code according to an embodiment of the invention.

FIG. 13 illustrates augmented style code 1242 and style generation code 1244 according to an embodiment of the invention. The augmented style code 1242 and style generation code 1244 are used as part of the overall solution for providing dynamically generated applications; in particular, these pieces of the solution allow for dynamic styling of user interfaces of the application.

Accordingly, in an embodiment the augmented style code 1242 comprises parameterized CSS files that can be used in deferred evaluable transformation system for high-performance, dynamic, run-time, parameterized finalization. The augmented style code 1242, in an embodiment, is provided as one or more input files that include modified CSS rules that have been augmented with additional expression-based syntax. In some embodiments, the augmented style code 1242 is generated by a technology provider and constructed purposefully to "expose" certain aspects of a UI to be modified through use of expressions 1310 including variables 1315.

In an embodiment, notably, the augmented style code 1242 input files might themselves be the output of other CSS pre-processing software, such as the Less.js dynamic style sheet language.

As depicted in FIG. 13, the illustrated augmented style code 1242A includes two rules—or style declarations—that each include style syntax 1320 and expressions 1310 (using variables 1315) demarcated by expression delimiters 1305. In this example, the expression delimiters 1305 comprise an opening delimiter (comprising a dollar sign followed by an open curly bracket) and a closing delimiter (comprising a closing curly bracket), though in other embodiments other opening and closing delimiters may be used, provided that they can be unambiguously identified by a parser. In this example, a first rule (for objects having a class matching the selector of ".rule1") includes three declarations (or, "sub-rules"), where a "width" attribute has an associated value including an expression 1310 defining the value to be a sum of an "itemWidth" variable added with the number thirty. A second declaration also includes an expression 1310 indicating that the attribute "border-style" is to have an associated attribute value represented by the value of a variable named "borderPattern". Finally, the first rule also includes a third declaration indicating that a "color" attribute is to have an associated attribute value represented by the value of variable named "defaultColor". A second rule (for objects having a class matching the selector of ".rule2") is similar to the first rule, as it also includes three declarations for the "width", "border-style", and "color" attributes. However, the expressions 1310 for the "width" and "color" are different—here, the attribute value for "width" is configured to represent 1.5 times the value of the itemWidth variable, and the attribute value for "color" is configured to be a result from an application of a "lighten( )" function using a variable "defaultColor" as its argument. This lighten( ) function may be a function that is part of a language of the later-generated style generation code 1244A, defined by the technology provider, or made available in some other manner.

The format of the expressions 1310 within the augmented code may be configured in a variety of ways—in an embodiment, the technology provider simply defines a grammar/syntax for these expressions 1310 that will be recognized by a parser used to generate the style generation code 1244A. However, in other embodiments the format of the expressions 1310 follows a defined language grammar/syntax of a common programming language.

With the one or more files representing the augmented style code 1242A, the customized style module instance 1240B will parse and compile the augmented style code 1242A into the style generation code 1244A. In an embodiment, the style generation code 1244A is JavaScript code that, when executed, injects CSS rules into an application loading (e.g., in a browser). In other embodiments, the style generation code 1244A is code of another language that is configured to generate valid CSS when executed with proper input arguments for the translated expressions 1355. In the depicted embodiment of FIG. 13, the style generation code 1244A comprises a set of functions that accept a set of input variables/arguments for itemWidth, borderPattern, and defaultColor, and that returns a string of valid CSS based upon the values of those arguments. In an embodiment, the style generation code 1244A is specifically designed to be fast. As an example, in some embodiments it does not include any explicit parsing. In some embodiments, the style generation code 1244A is designed to execute within a particular type of application 1226 (e.g., a web browser), designed to run on a server, or flexible to be run by either.

For example, in the depicted embodiment of FIG. 13, the generated style generation code 1244A is valid JavaScript code, where each parameterized CSS file (i.e., the augmented style code 1242A) is transformed into style generation code 1244A comprising a JavaScript function that takes several parameters as its input, one of which is a map of values made available for use within that function, as defined in the input parameterized CSS file (e.g., augmented style code 1242A). The generated style generation code 1244A is designed for high performance, and includes primarily simple string concatenation operations, along with any additional operations expressed in the parameterized CSS. In some deployments, this first step is intended to happen infrequently, as an initial build step for the application to be deployed.

This approach, which includes using augmented style code 1242A to generate style generation code 1244A, provides several distinct advantages that center around flexibility and performance. This approach is flexible because it allows parameterized style rules (e.g., CSS rules) to be easily "finalized" into standard rules for multiple environments/configurations. Additionally, this approach is performant because this "two-step" approach performs the computationally expensive aspects in its first "translating the augmented style code 1242A to generate the style generation code 1244A" step, which leaves a "lighter" amount of computational expense (e.g., at runtime by a relatively less powerful end station) in its second step of invoking the style generation code 1244A while preserving the power and expressiveness of style parameterization.

The second step of the solution includes having the style generation code 1244A deployed in an environment and ran as needed to obtain the desired level of customization. One implementation of that step can be to run it immediately after it is generated, as part of the same build process. This would be primarily useful in a situation where a finite number of parameters is known at build time, as matching style files (e.g., CSS files) can then be generated efficiently for each set of parameters. Thus, in some embodiments, the server end station (i.e., computing device(s) 1230) may directly use the style generation code 1244A to perform the "second step" to generate sets of valid style rules 1248 by calling the style generation code 1244A using a set of style generation invocations 1246. For example, the computing device(s) 1230, in the computer-readable storage media 1232, may store a set of style generation invocations for each user and/or user interface and/or deployment scenario that needs to be generated for the application. Another implementation of this second step can be to deploy the generated style generation code 1244A to web servers providing aspects of the application, and have those web servers "finalize" the style rules (e.g., CSS) based on a set of parameters that may vary with each request.

Yet another implementation of the second step can be to deploy the generated style generation code 1244A as part of client-side JavaScript files that are served to browsers, and have this style finalization code run within each user's browser using parameters acquired by the client-side application. Thus, in some embodiments, the server end station (i.e., computing device(s) 1230) may instead transmit the style generation code 1244A (directly or indirectly through other computing devices and/or processes) to an end station 1228, which itself will generate sets of valid style rules 1248 by calling the style generation code 1244A using a set of style generation invocations 1246. The set of style generation invocations 1246 may be stored locally at the end station 1228, retrieved from the server end station, or retrieved from another computing device. In an embodiment, although the same version of the style generation code 1244A may be transmitted to many different end stations of potentially different users of potentially different service agreements (dictating what content is to be presented by the application), the set of style generation invocations 1246 may be unique to each user, group of users, group of devices sharing a common characteristic, etc., to allow completely different applications to be generated.

In these embodiments of the invention, the separation of the parsing of the augmented style code 1242 (e.g., parameterized CSS) from the generation of the final style rules (e.g., by invoking the style generation code 1244A), is accomplished in a manner that enables that style generation to be fast, and to be able to be done in multiple environments, including in a browser where existing CSS preprocessor tools either do not support using the in such a fashion or are not practical due to the performance penalty that would come with using them in such a fashion.

FIG. 14A illustrates style generation invocation code 1246A that, when used to invoke the style generation code 1244A of FIG. 13, results in the illustrated set of valid style rules 1248A and the customized user interface 1425A being generated according to an embodiment of the invention. In this depicted embodiment, style generation invocation code 1246A comprises code (e.g., JavaScript code such as jQuery code) with a plurality of input variables 1425 corresponding to the variables/parameters of the style generation code 1244A. The style generation invocation code 1246A includes these input variables 1425 that comprise an attribute 1405 matching the variables of the translated expressions 1355 of the style generation code 1244A, and values 1410 to be used as arguments to invoke the style generation code 1244A to generate the set of valid style rules 1248A. In this depicted example, the input arguments include values 1410 of "50" for the attribute itemWidth, the value "solid" for the attribute border-style, and the value "#567A3C" for the attribute defaultColor. When invoked using these values, the style generation code 1244A will generate the illustrated set of valid style rules 1248A that are valid according to the style standard. As an example, the itemWidth of "50" is passed to the style generation code 1244A, which causes the first class selector ".rule1" to have a value of "80 px" (based upon the translated expression 1355 of "30+itemWidth" concatenated with "px"), and the second class selector ".rule2" to have a value of "75px" (based upon the translated expression 1355 of "1.5*itemWidth" concatenated with "px"). Similarly, the input argument values of border-style "solid" and defaultColor "#567A3C" cause the first class selector to have values of "solid" and "#567A3C" (just as passed in) and cause the second class selector to have values of "solid dashed" and "#6A8E50".

Accordingly, the invocation of the style generation code 1244A, in this embodiment, causes the style rules to be applied to the customized UI 1425A, which includes a first set of user identifiers 1445A (e.g., users "logged in" or "detected to be using" the application), a set of hub selection UI elements 1430 allowing the user(s) to perform functions in the application, and a first UI element 1435A and second UI element 1440A. For purposes of this illustration, first UI element 1435A (e.g., a <div>, <span>, etc.) has a class of "rule1" and will be presented according to the first rule of the generated set of style rules 1248A, and the second UI element 1440A has a class of "rule2" and will be presented according to the second rule of the generated set of style rules 1248A. In this example, the first UI element 1435A has a longer horizontal length (80 px) compared to the second UI element 1440A length (75 px), as dictated by the generated set of style rules 1248A. Similarly, the "rule1" border-style of the generated set of style rules 1248A causes the first UI element 1435A to have four solid borders, and the "rule2" border-style of the generated set of style rules 1248A causes the second UI element 1435A to have a "solid" top and bottom border, and a "dashed" left and right side border. Additionally, the "rule1" color of the generated set of style rules 1248A causes the first UI element 1435A to have a dark green border, and the "rule2" color of the generated set of style rules 1248A causes the second UI element 1435A to have a comparatively lighter green border.

Figure 14B:
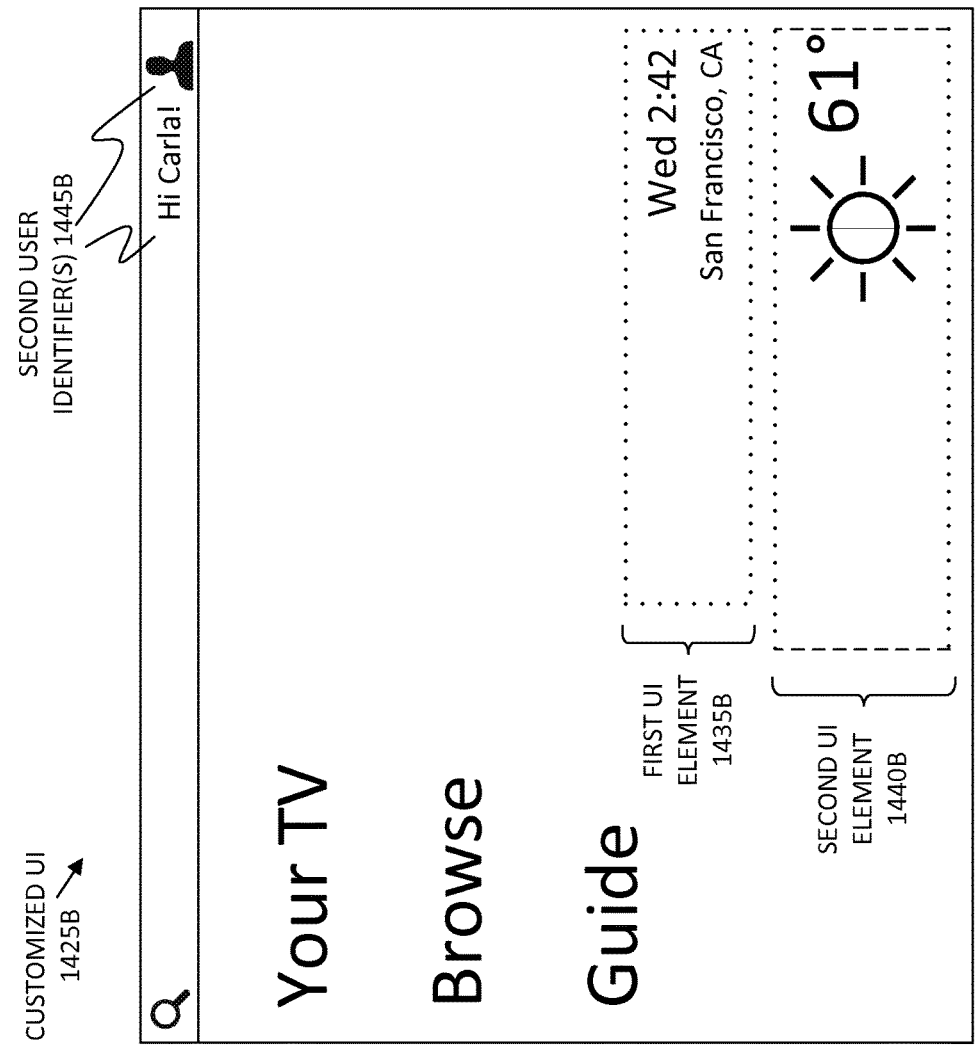
FIG. 14B illustrates additional style generation invocation code that, when used to invoke the style generation code of FIG. 13, results in the illustrated additional set of valid style rules and the additional customized user interface being generated according to an embodiment of the invention.

In a similar vein, FIG. 14B illustrates additional style generation invocation code 1246B that, when used to invoke the style generation code 1244A of FIG. 13, results in the illustrated additional set of valid style rules 1248B and the additional customized user interface 1425B being generated according to an embodiment of the invention. This additional style generation invocation code 1246B may, for example, be used by another user (e.g., represented by the second user identifier 1445B) of the same application or another device of the same (or a different) user to generate a (different) customized UI 1425B. In this depicted example, style generation invocation code 1246B instead includes an itemWidth of "70", a border-style of "dotted", and a defaultColor of "#333333". By invoking the style generation code 1244A with these parameters, the generated set of valid style rules 1248B will be different than the generated set of valid style rules 1248A despite both resulting from the use of the same style generation code 1244A. Thus, in this example, the first UI element 1435B will now be shorter than the second UI element 1440B, have four dotted, dark gray borders. Similarly, the second UI element 1440B will now be longer than the first UI element 1435B, have a light gray dotted top and bottom border and light gray dashed right and left borders.

FIG. 6 illustrates a flow 1500 in a server end station (e.g., computing device(s) 1230) for utilizing parameterized style rules (i.e., augmented style code 1242A) to allow for the dynamic runtime generation of user interfaces of an application according to embodiments of the invention.

The flow 1500 includes, at block 1505, transforming a set of one or more augmented style rules into style generation code. The set of augmented style code rules includes both style syntax (e.g., portions of CSS rules) and a set of one or more expressions including a set of one or more variables. However, the set of augmented style code rules are not valid according to a style standard (e.g., CSS) of the style syntax. This style generation code, when executed by a set of one or more invocations using a set of one or more input variables corresponding to the set of variables, generates a set of one or more valid style rules according to the style standard.

The flow also includes, at block 1510, executing the style generation code using the set of input variables to generate the set of valid style rules. In an embodiment, the set of input variables are part of the set of invocations, which may be code written in a common language with the style generation code. In an embodiment, the common language is JavaScript, and in an embodiment the set of valid style rules are CSS rules.

At block 1515, the flow further includes transmitting the set of valid style rules to an end station of a user, causing a customized user interface to be presented to the user. In an embodiment, the set of valid style rules are part of a CSS file, which is rendered by a browser application executing on the end station.

Optionally, the flow continues one or more times by executing the style generation code using another set of input variables to generate another set of valid style rules (at block 1520) and transmitting the another set of valid style rules to another end station of another user, which causes another customized user interface to be presented to the another user (at block 1525). Blocks 1520 and 1525 may optionally be executed one or more times, to easily and efficiently provide customized user interfaces for different users of the application/system. In an embodiment the user interfaces are of an IPTV application to allow the users to access content provided by an IPTV system.

As described above, the style generation code may be executed in a variety of locations by a variety of different devices. For example, the style generation code may be executed at an end station.

Figure 15:
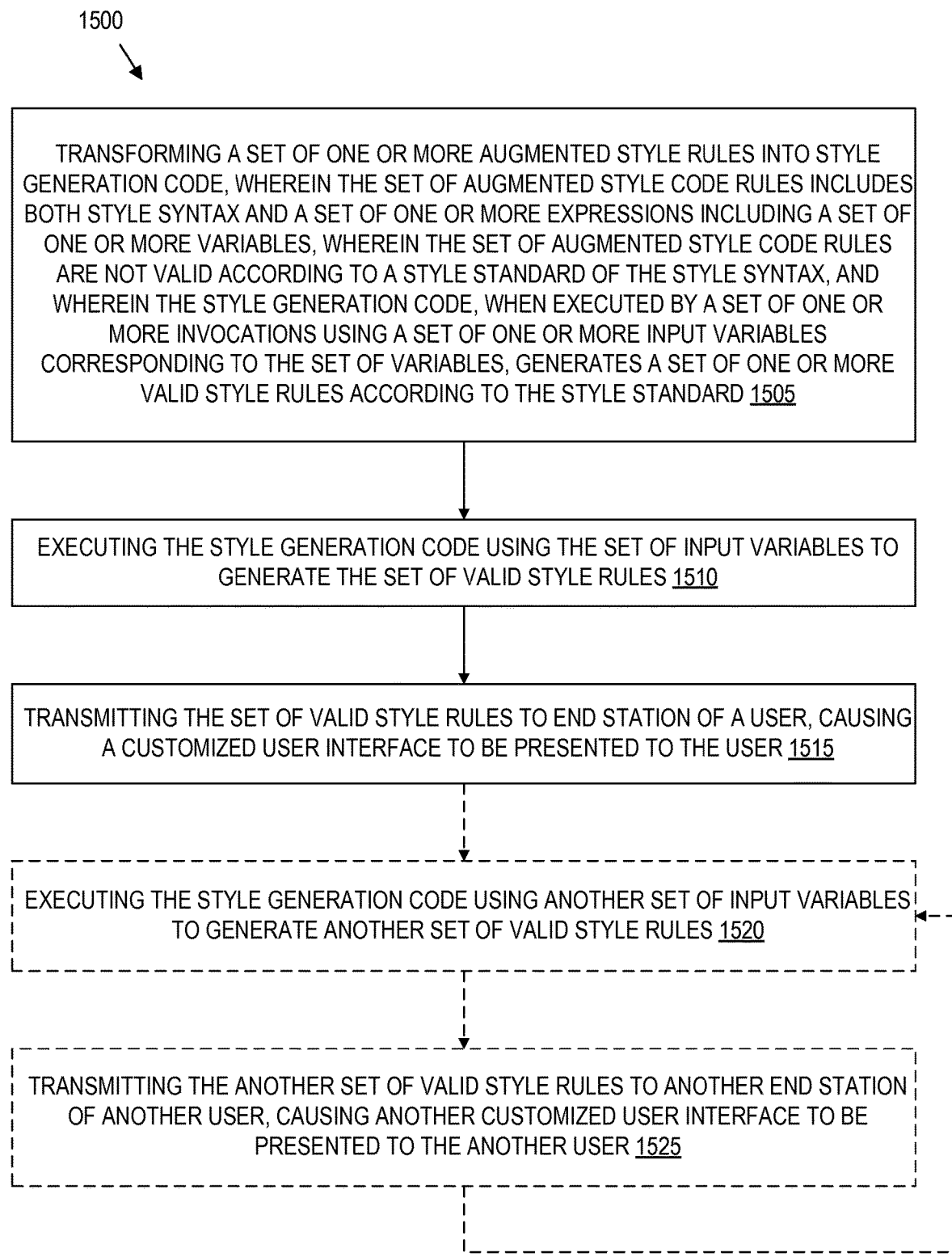
FIG. 15 illustrates a flow in a server end station for utilizing parameterized style rules to allow for the dynamic runtime generation of user interfaces of an application according to embodiments of the invention.
Figure 16:
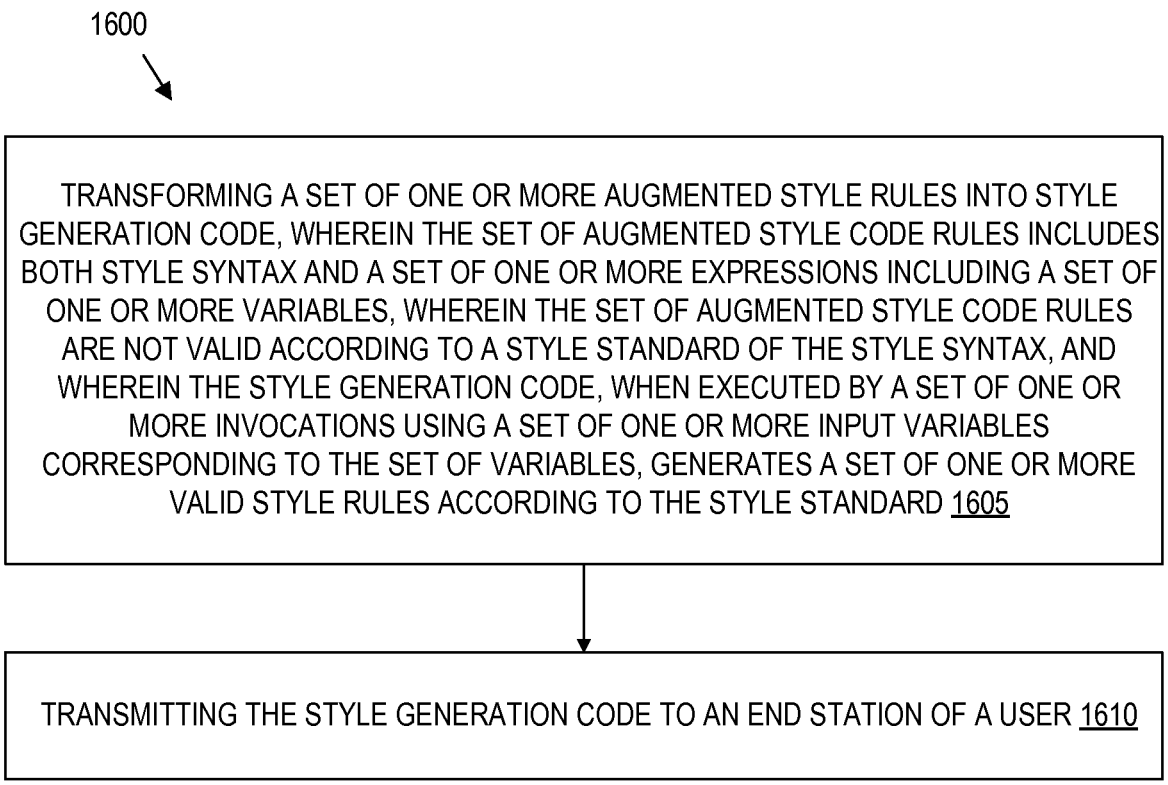
FIG. 16 illustrates a flow in a server end station for utilizing parameterized style rules to allow for the dynamic runtime generation of user interfaces of an application according to some embodiments of the invention.

FIG. 16 illustrates a flow 1600 in a server end station (e.g., computing device(s) 1230) for utilizing parameterized style rules (i.e., augmented style code 1242A) to allow for the dynamic runtime generation of user interfaces of an application according to embodiments of the invention. The operations of FIG. 16 is similar to the operations of FIG. 15 with the exception that the server end station transmits the style generation code to an end station which is then configured to execute the style generation code.

The flow 1600 includes, at block 1605, transforming a set of one or more augmented style rules into style generation code. The set of augmented style code rules includes both style syntax (e.g., portions of CSS rules) and a set of one or more expressions including a set of one or more variables. However, the set of augmented style code rules are not valid according to a style standard (e.g., CSS) of the style syntax. This style generation code, when executed by a set of one or more invocations using a set of one or more input variables corresponding to the set of variables, generates a set of one or more valid style rules according to the style standard. The flow also includes, at block 1610, transmitting the style generation code to an end station of a user.

FIG. 17 illustrates a flow 1700 in an end station for utilizing style generation code generated by a server end station for dynamic runtime generation of user interfaces of an application according to embodiments of the invention. Flow 1700 includes, at block 1705, receiving, at a set of network interfaces of the end station from a server end station, style generation code. The style generation code, when executed by a set of one or more invocations using a set of one or more input variables corresponding to the set of variables, generates a set of one or more valid style rules of a style standard and dynamically injects the valid style rules into an application. In an embodiment, the style rules are CSS rules, and in various embodiments the application may be a web application executing in a browser or a special-purpose application.

Optionally, the flow 1700 includes at block 1710 receiving, from the server end station, the set of invocations using the set of input variables. In other embodiments, though, the set of invocations are created at the end station (e.g., providing a user interface to solicit the arguments/values for the invocations) or retrieved from a different server end station or different end station.

At block 1715, the flow further includes causing the customized user interface to be presented to the user as a result of executing the style generation code according to the set of invocations. The user interface includes a set of one or more user interface elements that are styled according to the set of valid style rules.

Although FIGS. 13-17 focus upon the dynamic generation of style rules, embodiments are also able to dynamically create other portions of an application, including but not limited to components and behaviors, using similar systems. While embodiments have been described in relation to an IPTV system, alternative embodiments could instead be utilized for other systems using customizable applications. For example, embodiments described herein work in nearly any type of web application/site that can benefit from providing customized "views" into an application that reveal different interfaces, styles, functions, components, and/or behaviors.

While embodiments disclosed herein describe CSS as being used as a style standard and style sheet language, the scope of the invention is not to be limited to using CSS as the only UI styling language as other UI styling languages may be used.

Additionally, while many embodiments disclosed herein focus upon the parameterization of style rules (e.g., CSS), the scope of the invention is not to be so limited. Instead, in various embodiments of the invention, other types of computer code can be parameterized in this manner, including but not limited to structural and/or behavioral component code (e.g., JavaScript), structural code (e.g., HTML), and nearly any other type of code that can form portions of an application, whether it be a web application or other type of application.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a user end station for interactive editing of one or more UI components of a running instance of a web application, comprising:

acquiring a user interface (UI) definition file storing an externalized parameterized representation of the web application without application code and that fully defines the web application including its structure, behavior, and appearance, and includes a set of one or more UI components that are UI building blocks to be presented within the web application, wherein the UI definition file is configured for dynamic generation of application code representing the set of one or more UI components comprising at least one of HyperText Markup Language (HTML) and Cascading Style Sheets (CSS);

initializing an UI of the web application using the UI definition file, wherein the web application is dynamically generated at runtime under control of the UI definition file, and wherein initializing the UI of the web application using the UI definition file includes dynamically generating the application code representing the set of one or more UI components;

dynamically loading into the running instance of the web application on the user end station an interactive editor that allows editing of one or more of the set of the one or more UI components of the running instance of the web application;

receiving a selection of a first Document Object Model (DOM) element of the web application;

determining a first UI component for editing based upon the selected first DOM element;

determining, from the UI definition file, a first set of one or more parameters defining the determined first UI component;

displaying a value editor that is configured to display for at least one of the first set of one or more parameters a first value and allows for that first value to be modified to change a behavior of the first UI component;

receiving a modification of at least the first value of the at least one of the first set of one or more parameters to change the behavior of the first UI component; and updating the running instance of the web application to reflect the modified first value by modifying the UI definition file with the modified first value of the at least one of the first set of one or more parameters defining the determined first UI component and dynamically regenerating the running instance of the web application under control of the modified UI definition file to regenerate the first UI component to change the behavior of the first UI component based on the modified first value of the at least one of the first set of one or more parameters defining the first UI component.

2. The method of claim 1, further comprising:
persisting the modified UI definition file in storage of the user end station such that the modified web application under control of the modified UI definition file is used in future sessions.

3. The method of claim 1, wherein updating the running instance of the web application to reflect the modified first value includes performing the following:
wherein the UI definition file further includes a plurality of definitions indicating visual appearance attributes of portions of the web application and a set of behaviors that may be performed by the set of one or more UI components, wherein the set of behaviors includes the behavior of the first UI component, and wherein the plurality of definitions includes a plurality of attribute-value pairs;
parsing the modified UI definition file to identify the visual appearance attributes, the set of one or more UI components, and the set of behaviors; and
dynamically instantiating the set of one or more UI components based upon the parsed modified UI definition file and a set of one or more component definition files that include code for implementing the set of one or more UI components indicated by the UI definition file.

4. The method of claim 1, wherein updating the running instance of the web application to reflect the modified first value includes only reinitializing the UI of the web application.

5. The method of claim 1, further comprising:
wherein the running instance of the web application is of a first platform;

simulating, on the user end station, a UI of a second platform, wherein the second platform has a UI definition file that is different than the UI definition file of the first platform; and
updating the simulated UI of the second platform to reflect the modified first value of the at least one of the first set of one or more parameters defining the determined first UI component.

6. The method of claim 1, further comprising:
receiving a selection of a second DOM element of the web application;
determining a second UI component for editing based upon the selected second DOM element;
determining that the second UI component supports direct manipulation that allows the edit to be applied without an update of the entire UI;
receiving an edit to the selected second DOM element; and
updating the UI of the web application to reflect the edit to the selected second DOM element without updating the entire UI.

7. The method of claim 1, further comprising:
transmitting a message describing the modified first value to a server that is configured to distribute the message to one or more different user end stations to cause those one or more different user end stations to each modify a running instance of a web application on their respective user end station to reflect the modified first value.

8. The method of claim 1, further comprising:
receiving, from a server, a message describing a modified value to change a behavior of a second UI component of the web application; and
updating the running instance of the web application to reflect the modified value for the second UI component.

9. A non-transitory computer-readable storage medium storing instructions for interactive editing of one or more UI components of a running instance of a web application which, when executed by a set of one or more processors of a user end station, cause the user end station to performing operations comprising:
acquiring a user interface (UI) definition file storing an externalized parameterized representation of the web application without application code and that fully defines the web application including its structure, behavior, and appearance, and includes a set of one or more UI components that are UI building blocks to be presented within the web application, wherein the UI definition file is configured for dynamic generation of application at representing the set of one or more UI components comprising at least one of HyperText Markup Language (HTML) and Cascading Style Sheets (CSS);
initializing an UI of the web application using the UI definition file, wherein the web application is dynamically generated at runtime under control of the UI definition file, and wherein initializing the UI of the web application using the UI definition file includes dynamically generating the application code representing the set one or more of UI components;
dynamically loading into the running instance of the web application on the user end station an interactive editor that allows editing of one or more of the set of the one or more UI components of the running instance of the web application;
receiving a selection of a first Document Object Model (DOM) element of the web application;

determining a first UI component for editing based upon the selected first DOM element;

determining, from the UI definition file, a first set of one or more parameters defining the determined first UI component;

displaying a value editor that is configured to display for at least one of the first set of one or more parameters a first value and allows for that first value to be modified to change a behavior of the first UI component;

receiving a modification of at least the first value of the at least one of the first set of one or more parameters to change the behavior of the first UI component; and updating the running instance of the web application to reflect the modified first value by modifying the UI definition file with the modified first value of the at least one of the first set of one or more parameters defining the determined first UI component and dynamically regenerating the running instance of the web application under control of the modified UI definition file to regenerate the first UI component to change the behavior of the first UI component based on the modified first value of the at least one of the first set of one or more parameters defining the first UI component.

10. The non-transitory computer-readable storage medium of claim 9, wherein the non-transitory computer-readable storage medium further stores instructions that, when executed by the set of one or more processors of the user end station, cause the user end station to further perform the following operation:

persisting the modified UI definition file in storage of the user end station such that the modified web application under control of the modified UI definition file is used in future sessions.

11. The non-transitory computer-readable storage medium of claim 9, wherein updating the running instance of the web application to reflect the modified first value includes performing the following:

wherein the UI definition file further includes a plurality of definitions indicating visual appearance attributes of portions of the web application and a set of behaviors that may be performed by the set of one or more UI components, wherein the set of behaviors includes the behavior of the first UI component, and wherein the plurality of definitions includes a plurality of attribute-value pairs;

parsing the modified UI definition file to identify the visual appearance attributes, the set of one or more UI components, and the set of behaviors; and dynamically instantiating the set of one or more UI components based upon the parsed modified UI definition file and a set of one or more component definition files that include code for implementing the set of one or more UI components indicated by the UI definition file.

12. The non-transitory computer-readable storage medium of claim 9, wherein updating the running instance of the web application to reflect the modified first value includes only reinitializing the UI of the web application.

13. The non-transitory computer-readable storage medium of claim 9, wherein the non-transitory computer-readable storage medium further stores instructions that, when executed by the set of the one or more processors of the user end station, cause the user end station to further perform the following operations:

wherein the running instance of the web application is of a first platform;

simulating, on the user end station, a UI of a second platform, wherein the second platform has a UI definition file that is different than the UI definition file of the first platform; and updating the simulated UI of the second platform to reflect the modified first value of the at least one of the first set of one or more parameters defining the determined first UI component.

14. The non-transitory computer-readable storage medium of claim 9, wherein the non-transitory computer-readable storage medium further stores instructions that, when executed by the set of one or more processors of the user end station, cause the user end station to further perform the following operations:

receiving a selection of a second DOM element of the web application;

determining a second UI component for editing based upon the selected second DOM element;

determining that the second UI component supports direct manipulation that allows the edit to be applied without an update of the entire UI;

receiving an edit to the selected second DOM element; and updating the UI of the web application to reflect the edit to the selected second DOM element without updating the entire UI.

15. The non-transitory computer-readable storage medium of claim 9, wherein the non-transitory computer-readable storage medium further stores instructions that, when executed by the set of one or more processors of the user end station, cause the user end station to further perform the following operation:

transmitting a message describing the modified first value to a server that is configured to distribute the message to one or more different user end stations to cause those one or more different user end stations to each modify a running instance of a web application on their respective user end station to reflect the modified first value.

16. The non-transitory computer-readable storage medium of claim 9, wherein the non-transitory computer-readable storage medium further stores instructions that, when executed by the set of one or more processors of the user end station, cause the user end station to further perform the following operations:

receiving, from a server, a message describing a modified value to change a behavior of a second UI component of the web application; and updating the running instance of the web application to reflect the modified value for the second UI component.

17. A user end station for interactive editing of one or more UI components of a running instance of a web application, comprising:

a processor; and a non-transitory computer-readable storage medium coupled to the processor and containing instructions executable by said processor whereby said user end station is operative to:

acquire a user interface (UI) definition file storing an externalized parameterized representation of the web application and that fully defines the web application including its structure, behavior, and appearance, and includes a set of one or more UI components that are UI building blocks to be presented within the web application, wherein the UI definition file is configured for dynamic generation of application code representing the set of one or more UI components comprising at least one of HyperText Markup Language (HTML) and Cascading Style Sheets (CSS);

initialize an UI of the web application using the UI definition file, wherein the web application is configured to be dynamically generated at runtime under control of the UI definition file, and wherein initialization of the UI of the web application using the UI definition file includes a dynamic generation of the application code representing the set of one or more UI components;

dynamically load into the running instance of the web application on the user end station an interactive editor that allows editing of one or more of the set of the one or more UI components of the running instance of the web application;

receive a selection of a first Document Object Model (DOM) element of the web application;

determine a first UI component for editing based upon the selected first DOM element;

determine, from the UI definition file, a first set of one or more parameters defining the determined first UI component;

display a value editor that is configured to display for at least one of the first set of one or more parameters a first value and allows for that first value to be modified to change a behavior of the first UI component;

receive a modification of at least the first value of the at least one of the first set of one or more parameters to change a behavior of the first UI component; and update the running instance of the web application to reflect the modified first value by modifying the UI definition file with the modified first value of the at least one of the first set of one or more parameters defining the determined first UI component and dynamically regenerating the running instance of the web application under control of the modified UI definition file to regenerate the first UI component to change the behavior of the first UI component based on the modified first value of the at least one of the first set of one or more parameters defining the first UI component.

18. The user end station of claim 17, wherein the non-transitory computer-readable storage medium further contains instructions executable by said processor whereby said user end station is further operative to:
persist the modified UI definition file in storage of the user end station such that the modified web application under control of the modified UI definition file is used in future sessions.

19. The user end station of claim 17, wherein the update of the running instance of the web application to reflect the modified first value includes the user end station to:
wherein the UI definition file further includes a plurality of definitions indicating visual appearance attributes of portions of the web application and a set of behaviors that may be performed by the set of one or more UI components, wherein the set of behaviors includes the behavior of the first UI component, and wherein the plurality of definitions includes a plurality of attribute-value pairs;

parse the modified UI definition file to identify the visual appearance attributes, the set of UI one or more components, and the set of behaviors; and dynamically instantiate the set of one or more UI components based upon the parsed modified UI definition file and a set of one or more component definition files that include code for implementing the set of one or more UI components indicated by the UI definition file.

20. The user end station of claim 17, wherein the update of the running instance of the web application to reflect the modified first value includes a reinitialization of only the UI of the web application.

21. The user end station of claim 17, wherein the running instance of the web application is of a first platform; and wherein the non-transitory computer-readable storage medium further contains instructions executable by said processor whereby said user end station is further operative to:
simulate, on the user end station, a UI of a second platform, wherein the second platform has a UI definition file that is different than the UI definition file of the first platform; and
update the simulated UI of the second platform to reflect the modified first value of the at least one of the first set of one or more parameters defining the determined first UI component.

22. The user end station of claim 17, wherein the non-transitory computer-readable storage medium further contains instructions executable by said processor whereby said user end station is further operative to:
receive a selection of a second DOM element of the web application;
determine a second UI component for editing based upon the selected second DOM element;
determine that the second UI component supports direct manipulation that allows the edit to be applied without an update of the entire UI;
receive an edit to the selected second DOM element; and
update the UI of the web application to reflect the edit to the selected second DOM element without updating the entire UI.

23. The user end station of claim 17, wherein the non-transitory computer-readable storage medium further contains instructions executable by said processor whereby said user end station is further operative to:
transmit a message describing the modified first value to a server that is configured to distribute the message to one or more different user end stations to cause those one or more different user end stations to each modify a running instance of a web application on their respective user end station to reflect the modified first value.

24. The user end station of claim 17, wherein the non-transitory computer-readable storage medium further contains instructions executable by said processor whereby said user end station is further operative to:
receive, from a server, a message describing a modified value to change a behavior of a second UI component of the web application; and
update the running instance of the web application to reflect the modified value for the second UI component.

* * * * *